(12) United States Patent
Li et al.

(10) Patent No.: US 10,218,767 B2
(45) Date of Patent: Feb. 26, 2019

(54) METHOD, SYSTEM AND BROWSER FOR EXECUTING ACTIVE OBJECT OF BROWSER

(71) Applicant: BEIJING QIHOO TECHNOLOGY COMPANY LIMITED, Beijing (CN)

(72) Inventors: Jinwei Li, Beijing (CN); Yuesong He, Beijing (CN); Zhi Chen, Beijing (CN); Yu Fu, Beijing (CN); Ming Li, Beijing (CN); Huan Ren, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 838 days.

(21) Appl. No.: 14/655,159

(22) PCT Filed: Aug. 30, 2013

(86) PCT No.: PCT/CN2013/082659
§ 371 (c)(1),
(2) Date: Jun. 24, 2015

(87) PCT Pub. No.: WO2014/101455
PCT Pub. Date: Jul. 3, 2014

(65) Prior Publication Data
US 2015/0334159 A1 Nov. 19, 2015

(30) Foreign Application Priority Data

Dec. 25, 2012 (CN) .......................... 2012 1 0572598
Dec. 25, 2012 (CN) .......................... 2012 1 0572600
Dec. 25, 2012 (CN) .......................... 2012 1 0573044

(51) Int. Cl.
*H04L 29/08* (2006.01)
*H04L 29/06* (2006.01)
*G06F 9/54* (2006.01)

(52) U.S. Cl.
CPC ............. *H04L 67/02* (2013.01); *G06F 9/54* (2013.01); *H04L 67/28* (2013.01); *H04L 67/34* (2013.01); *H04L 67/42* (2013.01)

(58) Field of Classification Search
CPC ......... H04L 67/02; H04L 67/28; H04L 67/34; H04L 67/42; G06F 9/54
See application file for complete search history.

(56) References Cited

U.S. PATENT DOCUMENTS

| | | | | |
|---|---|---|---|---|
| 2005/0149726 | A1* | 7/2005 | Joshi | ................ G06F 21/51 713/164 |
| 2006/0173981 | A1* | 8/2006 | Zhang | ................ H04L 41/0253 709/223 |

(Continued)

FOREIGN PATENT DOCUMENTS

| | | | | |
|---|---|---|---|---|
| CN | 101686130 | A * | 3/2010 | |
| CN | 101788982 | A * | 7/2010 | ............. G06F 21/53 |

(Continued)

OTHER PUBLICATIONS

Zhi, C. et al., English abstract only of Chinese application No. CN102314510A, Method and system for executing browser control, publication date Jan. 11, 2012, one page.

(Continued)

*Primary Examiner* — Kostas J Katsikis
(74) *Attorney, Agent, or Firm* — POLSINELLI PC

(57) ABSTRACT

The present disclosure discloses a method, a system and a browser for executing a browser active object. In the present invention, a proxy object is run in a page process and an active object is run in an independent process, so that a true plug-in is separated from the page process. The present invention further discloses an inter-process script execution (Continued)

method, system and browser. The present invention further discloses a browser active object executing method and system, and a browser.

18 Claims, 13 Drawing Sheets

(56) References Cited

U.S. PATENT DOCUMENTS

| | | | |
|---|---|---|---|
| 2007/0199000 A1* | 8/2007 | Shekhel | G06F 9/468 719/330 |
| 2007/0199073 A1 | 8/2007 | Plummer | |
| 2007/0233807 A1* | 10/2007 | Nix | G06F 17/30899 709/217 |
| 2008/0228899 A1* | 9/2008 | Plamondon | H04L 67/28 709/219 |
| 2008/0228938 A1* | 9/2008 | Plamondon | H04L 12/4641 709/233 |
| 2008/0229017 A1* | 9/2008 | Plamondon | H04L 67/2847 711/118 |
| 2008/0229021 A1* | 9/2008 | Plamondon | H04L 67/2847 711/125 |
| 2008/0229023 A1* | 9/2008 | Plamondon | G06F 12/0862 711/126 |
| 2008/0229024 A1* | 9/2008 | Plamondon | H04L 67/28 711/126 |
| 2008/0229025 A1* | 9/2008 | Plamondon | G06F 12/0862 711/126 |
| 2009/0064309 A1* | 3/2009 | Boodaei | G06F 21/52 726/12 |

FOREIGN PATENT DOCUMENTS

| | | | |
|---|---|---|---|
| CN | 102902912 A | * | 1/2013 |
| CN | 103019733 A | * | 4/2013 |
| CN | 103064750 A | * | 4/2013 |

OTHER PUBLICATIONS

Li, M. et al., English abstract only of Chinese application No. CN103019733A, Method and device for creating active object of browser and browser, publication date Apr. 3, 2013, one page.

International Search Report regarding PCT/CN2013/082659, dated Dec. 12, 2013, 3 pages.

Li J. et al., English abstract only of Chinese application No. CN103019734A, Activity object implementation method, system and browser, publication date Apr. 3, 2013, one page.

Li J. et al., English abstract only of Chinese application No. CN103034503A, Script executing method, system and browser, publication date Apr. 10, 2013, one page.

Li J. et al., English abstract only of Chinese application No. CN103064750A, Interrupt restoring method and device for browser control, publication date Apr. 24, 2013, one page.

Li J. et al., English abstract only of Chinese application No. CN103077016A, Moving object establishing method and device and browser, publication date May 1, 2013, one page.

Li J. et al., English abstract only of Chinese application No. CN103077092A, Browser control recovering method and system, publication date May 1, 2013, one page.

Li J. et al., English abstract only of Chinese application No. CN103077194A, Method and device for creating active object of browser and browser, publication date May 1, 2013, one page.

* cited by examiner

METHOD, SYSTEM AND BROWSER FOR EXECUTING ACTIVE OBJECT OF BROWSER

FIELD OF THE INVENTION

The present invention relates to the field of computer network technologies, and in particular, to a method, a system, and a browser for executing a browser active object.

BACKGROUND OF THE INVENTION

When a browser is opened, a webpage progress of the browser will create an active object and then perform various operations of the webpage. The active object usually refers to a plug-in of the browser, such as an ActiveX plug-in.

The ActiveX plug-in is an extension interface manner which is supported by an IE kernel browser of Microsoft Inc. and enhances browsing experience. A typical plug-in comprises Flash, Baidu video, QVOD and the like. The ActiveX plug-in is a reusable software assembly. Through use of the ActiveX plug-in, a special function can be quickly added to a website, desktop application and a development tool. For example, a StockTicker plug-in can be used to add activity information to a webpage in real time, and an animation plug-in can be used to add an animation property to a webpage.

When the ActiveX plug-in runs in a webpage process of the IE browser, the average quality of the Active X plug-in is made poor due to the large number, complicated running environment and openness of ActiveX plug-ins. Once the ActiveX plug-in is confronted with issues such as a halt or failure, the whole webpage will be caused to exit, which affects the stability of the webpage operation. On the contrary, if the webpage process is confronted with issues such as a halt or failure for some reason, the ActiveX plug-in in the webpage will be caused to exit, which affects the stability of the ActiveX plug-in.

In addition, IPC (Inter-Process Communication) refers to some techniques or methods for transmitting data or signals between at least two processes or threads. A process is a minimum unit for a computer system to allocate resources. Each process has a portion of independent system resources of its own, and processes are isolated from one another. The inter-process communication is provided to enable different processes to access one another's resources and perform coordination. Different processes may run on the same computer or different computers connected via networks.

Generally speaking, the inter-process communication needs to be achieved in the following situations:

(1) Data transmission: a process needs to transmit its own data to another process, with the quantity of transmitted data being in a range between one byte and several mega bytes.

(2) Data sharing: a plurality of processes desire to operate shared data, when one process modifies the shared data, other processes are supposed to see the modification immediately.

(3) Notification of events: a process needs to transmit a message to another process or a group of processes to notify it (them) of the occurrence of a certain event (e.g., notify a parent process when the process terminates).

(4) Resource sharing: a plurality of processes share the same resource. To this end, a core is needed to provide a locking and synchronization mechanism.

(5) Process control: some process desires to completely control the execution of another process (e.g., a Debug process), at this point, the control process desires to intercept all traps and exceptions of another process and know status changes thereof in time.

However, the existing art has not yet provided a solution for executing inter-process script, and current methods cannot be used to implement interactive execution of inter-process scripts.

When the ActiveX plug-in runs in a webpage process of the IE browser, the average quality of the Active X plug-in is made poor due to the large number, complicated running environment and openness of ActiveX plug-ins. Once the ActiveX plug-in is confronted with issues such as a halt or failure, the whole webpage will be caused to exit, which affects the stability of the webpage operation. On the contrary, if the webpage process is confronted with issues such as a halt or failure for some reason, the ActiveX plug-in in the webpage will be caused to exit, which affects the stability of the ActiveX plug-in.

SUMMARY OF THE INVENTION

In view of the above problems, the present invention is proposed to provide a system for executing a browser active object, a browser, and a corresponding method for executing a browser active object, which can overcome the above problems or at least partially solve the above problems.

According to an aspect of the present invention, there is provided a method for executing a browser active object, the active object being an object corresponding to an ActiveX plug-in, the method comprising: before the active object is created, intercepting a webpage process to query for a safety interface of a pre-created active object, and returning information indicating the ActiveX plug-in is a safe plug-in; intercepting a procedure of the webpage process creating the active object, and creating a proxy object to replace an active object actually to be created, with the proxy object running in the webpage process; when the webpage process activates the proxy object, creating the active object actually to be created in an independent process independent from the webpage process, with the active object running in the independent process; a communication window is created respectively in the active object and the proxy object; the active object and the proxy object communicating via the communication windows, thus realizing that the proxy object invokes the active object and/or the active object invokes the proxy object.

According to another aspect of the present invention, there is provided a system for executing a browser active object, comprising: a webpage process module, configured to, before the active object is created, intercept a webpage process to query for a safety interface of a pre-created active object, and return information indicating the active object is a safe plug-in; and intercept a procedure of the webpage process creating the active object, and create a proxy object to replace an active object actually to be created, with the proxy object running in the webpage process; an independent process module, configured to, when the webpage process activates the proxy object, create the active object actually to be created in an independent process independent from the webpage process, with the active object running in the independent process; the proxy object is located in the webpage process module, the active object is located in the independent process module, and a communication window is created respectively in the active object and the proxy object; the active object is an active object corresponding to the ActiveX plug-in; the active object and the proxy object communicating via the communication windows, thus realizing that the proxy object invokes the active object and/or the active object invokes the proxy object.

According to a further aspect of the present invention, there is provided a browser comprising the above system for executing a browser active object.

According to a further aspect of the present invention, there is provided a computer program which comprises a computer readable code, wherein when the computer readable code is run on a server, the server executes the method for executing a browser active object according to any one of claims 1-9.

According to a further aspect of the present invention, there is provided a computer readable medium which stores the computer program.

In the present invention, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the ActiveX plug-in is improved.

According to a solution provided by one aspect of the present invention, after the active object transmits the script to the proxy object, the proxy object queries for an interface in the webpage process related to the script execution, obtains the script executing method according to the interface, and then executes the script transmitted by the active object according to the script executing method, thereby achieving the script execution between different processes and implementing control of the webpage running in the webpage process by the active object running in the independent process.

According to a solution provided by another aspect of the present invention, after the proxy object transmits the script to the active object, the proxy object invokes the scheduling interface of the active object to obtain the scheduling identification of the to-be-executed method in the script; after the proxy object feeds back the scheduling identification to the webpage, the proxy object intercepts an instruction in the webpage process executing the to-be-executed method in the script and transmits the instruction to the active object, the active object executes the instruction and returns an execution result resulting from the execution of the instruction to the proxy object, thereby achieving the script execution between different processes and implementing control of the active object running in the independent process by the webpage running in the webpage process.

In the present invention, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the ActiveX plug-in is improved. Furthermore, the method is compatible with all ActiveX plug-ins, including plug-ins whose script safety is declared in a registration table and plug-ins whose script safety is not declared in the registration table.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference numbers denote the same part. In the figures.

DETAILED DESCRIPTION OF THE INVENTION

The present invention will be further described below with reference to figures and specific embodiments.

Figure 1:
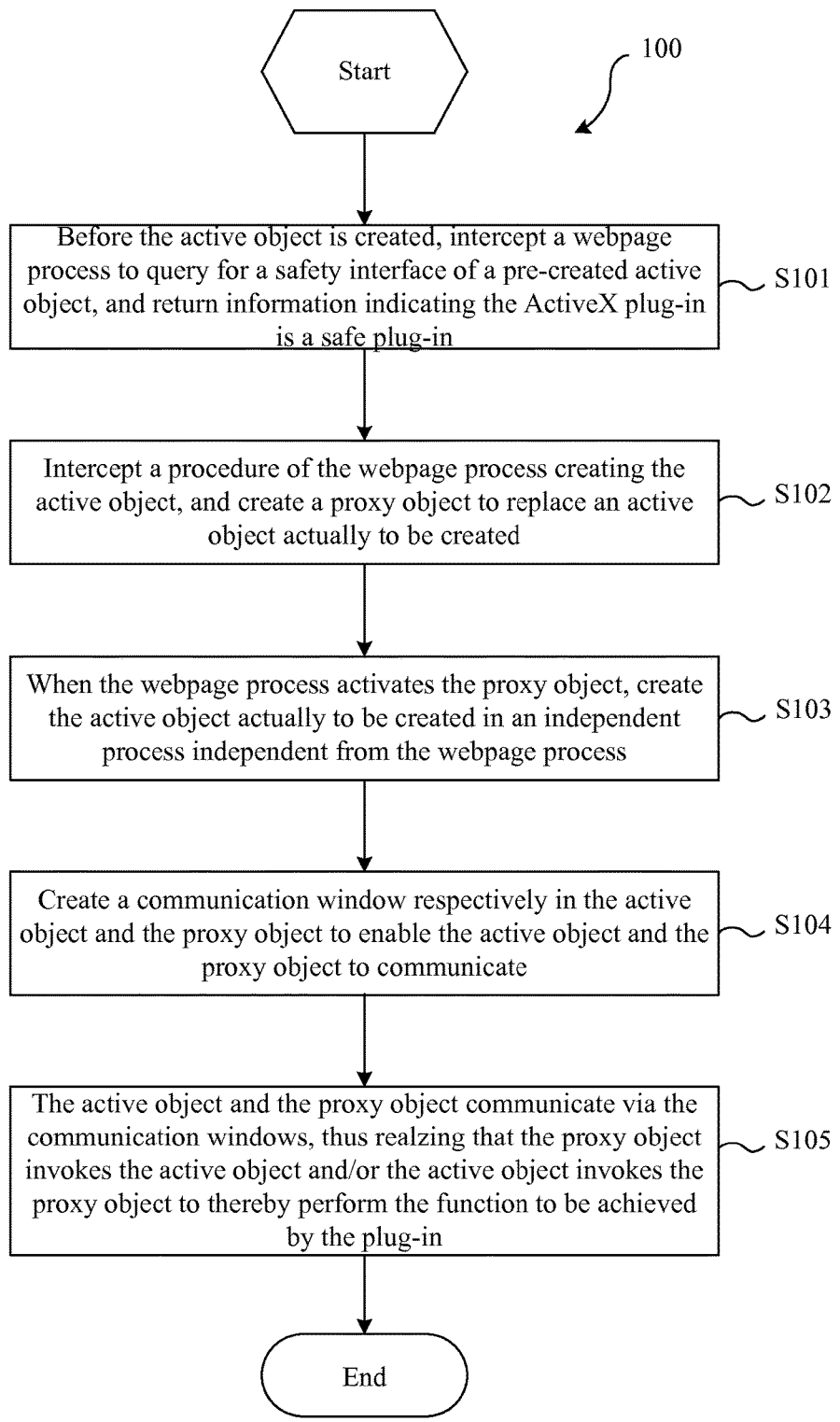
FIG. 1 illustrates a flow chart of a method for executing a browser active object according to an embodiment of the present invention.

FIG. 1 illustrates a flow chart of a method 100 for executing a browser active object according to an embodiment of the present invention. In the method, the active object is an object corresponding to the ActiveX plug-in, and the ActiveX plug-in may be a video play plug-in such as Baidu video or QVOD, but the present invention is not limited to this. As shown in FIG. 1, the method 100 begins with step S101, wherein before the active object is created, a webpage process is intercepted to query for a safety interface of a pre-created active object, and information indicating the ActiveX plug-in is a safe plug-in is returned. Specifically, in the case that there is a ActiveX plug-in in the webpage, before the webpage process of the browser creates the ActiveX plug-in, a registration table is firstly queried to look up whether the registration table related to the plug-in declares the safety of a script of the plug-in. Usually, regarding the type of plug-ins such as Baidu video or QVOD, the registration table generally does not declare safety of its script, so after the registration table is queried, an active object will be pre-created, the safety of the plug-in is determined by querying for a safety interface (IObjectSafety) of the pre-created active object, and the active object of the plug-in is truly created only when the plug-in is determined safe. Regarding the type of plug-ins such as Baidu video or QVOD, if the special processing is not performed here, information about warning or not creating an object will be displayed so that such type of plug-ins cannot operate normally. Therefore, in the method, the IObjectSafety interface for the webpage process to query for the pre-created active object is intercepted, and information indicating the plug-in is a safe plug-in is directly returned. For example, when the webpage process queries for the IObjectSafety interface of the pre-created active object, the interface is intercepted, the IObjectSafety interface indicative of plug-in safety is returned thereto, INTERFACESAFE_FOR_UNTRUSTED_CALLER| INTERFACESAFE_FOR_UNTRUSTED_DATA is returned via GetInterfaceSafetyOptions to indicate that the plug-in is safe in script and safe in initialization, and thereby safety verification can be smoothly passed.

Figure 2:
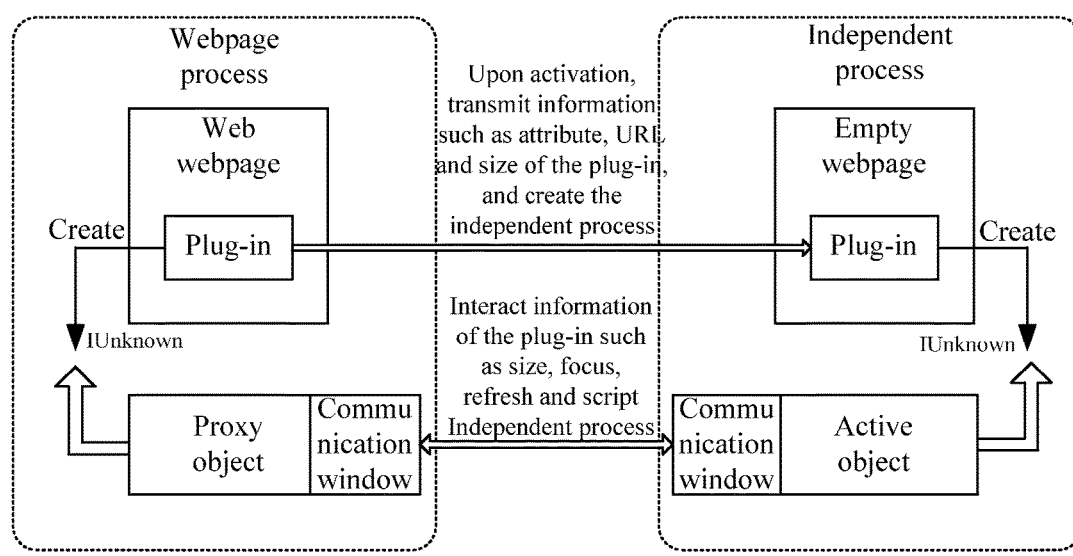
FIG. 2 illustrates a schematic diagram of a procedure of creating a proxy object and an active object in the present invention.

FIG. 2 illustrates a schematic diagram of a procedure of creating a proxy object and an active object in the present invention. As shown in FIG. 2, a Web webpage and a proxy object run in the webpage process, and an empty webpage and an active object run in an independent process. Subsequent steps are further introduced below in detail with reference to FIG. 2.

After step S101, the method 100 proceeds to step S102, wherein a procedure of a webpage process creating an active object is intercepted, a proxy object is created to replace an active object actually to be created, and the proxy object runs in the webpage process. Specifically, when the webpage process of the browser creates an active object, CoGetClassObject is intercepted, and a proxy object is created to replace the active object actually to be created. The proxy object includes a series of interfaces, including many standard interfaces that will be invoked by an IUnknown pointer, such as IOleObject and IViewObject. Then, when CreateInstance of IClassFactory is invoked, the created proxy object is returned to the IUnknown pointer of the webpage process, whereby creation of the proxy object is completed.

Then, the method 100 proceeds to step S103, wherein when the webpage process activates the proxy object, the active object actually to be created is created in an independent process independent from the webpage process, and the active object is run in the independent process. Specifically, when the webpage process activates the proxy object, information related to the plug-in such as attribute, URL and size is extracted, and then an independent process is created. First, a document, namely, an empty webpage, is created, an object is inserted therein, the independent process invokes CoGetClassObject, intercepts the CoGetClassObject and creates an active object. The active object comprises a series of interfaces, including many standard interfaces that will be invoked by an IUnknown pointer, such as IOleObject and IViewObject. Then when CreateInstance of IClassFactory is invoked, the created active object is returned to the IUnknown pointer of the independent process, whereby creation of the active object is completed. The active object is an object which truly realizes the plug-in function.

During creation of the active object, the active object can still be normally created in the case that IWeBrowser2 interface may not be implemented for some plug-ins such as Flash plug-in. However, regarding the type of plug-ins such as Baidu video or QVOD, creation of the active object will fail if the IWeBrowser2 interface is not implemented. The IWeBrowser 2 is implemented mainly to perform functions such as skipping (Navigate method), obtainment of an URL (Get_LocationURL method) and obtainment of a webpage (IHtmlDocument interface under get_document method). In order to perform these functions, when the independent process queries for the IWeBrowser2 interface, it is intercepted, and then a self-created IWeBrowser2 interface is returned so as to create the active object of the above plug-in.

Then, the method 100 proceeds to step S104, wherein a communication window associated with a plug-in object is created respectively in the proxy object and the active object to enable the proxy object and the active object to communicate. Through the two communication windows, the two objects may interact with respect to size, focus, refresh, script and other information of the plug-in.

Then, the method 100 proceeds to step S105, wherein the active object and the proxy object communicate via the communication windows so that the proxy object invokes the active object and/or the active object invokes the proxy object so as to perform the function to be achieved by the plug-in.

Furthermore, if there is a nested structure in the Web webpage, i.e., the parent process runs a plurality of parent webpages and a plurality of subpages. Whenever the webpage process creates a subpage and its proxy object, a proxy object ID (may also include its URL) of the subpage and a proxy object ID (may also include its URL) of the subpage's parent webpage are sent to the independent process in which an active object is created according to a corresponding hierarchical structure. In this case, a plurality of proxy objects run in the webpage process, a plurality of active objects run in the dependent process, there is a one-to-one correspondence between the proxy objects and the active objects, the communication window of each proxy object has a corresponding attribute with the communication window of the active object corresponding to the proxy object, and communication between the active object and the corresponding proxy object is achieved through the two communication windows.

In this method, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the ActiveX plug-in is improved.

In the above method, since the true ActiveX plug-in is separate from the webpage process, when a plug-in window is expected to be displayed in the original Web webpage, a plug-in window corresponding to the active object may be arranged at a location of the plug-in window of the original Web webpage, the plug-in window corresponding to the active object may move and zoom without affecting the Web webpage.

According to the method provided by the above embodiment, when the Web webpage rolls, the plug-in window may not roll therewith. Specifically, according to the current operation, when the Web webpage rolls, a GetWindow method of an IOleWindow interface of the active object will be invoked to judge whether the active object has a corresponding window, a WM_MOVE message is sent to move the window if there is the window. However, according to the present invention, a null value can be returned when the GetWindow method of the IOleWindow interface of the active object is invoked so that the window will not roll therewith.

Furthermore, on the basis that the proxy object and the active object are created as stated above, the communication between the active object and the proxy object comprises an inter-process script executing procedure. The script executing procedure comprises a procedure of the proxy object executing a script of the active object, and a procedure of the active object executing a script of the proxy object, which will be introduced respectively below.

Figure 3:
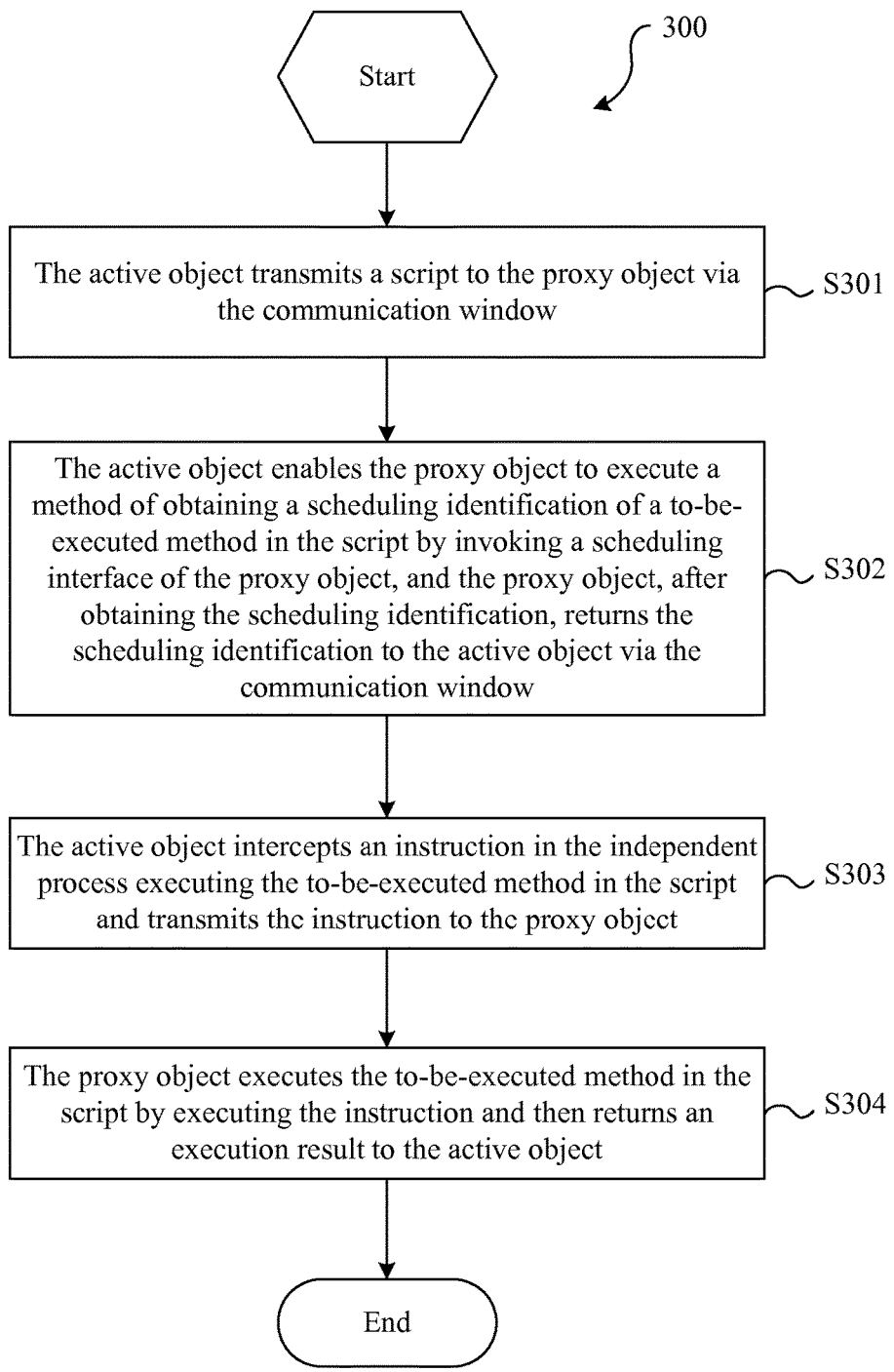
FIG. 3 illustrates a flowchart of a method of the proxy object executing a script of the active object in the present invention.

FIG. 3 illustrates a flowchart of a method 300 of the proxy object executing a script of the active object in the present invention. The method is adapted for the case that the proxy object running in the webpage process executes a script of the active object running in the independent process, i.e., the method is a method of the active object running in the independent process controlling the webpage in the webpage process. As shown in FIG. 3, the method 300 begins with step S301, wherein the active object transmits the script to the proxy object via the communication window. Taking a user clicking a button created on the plug-in window to trigger the webpage to become black as an example, when the user clicks the button on the plug-in window, the active object of the plug-in obtains a script corresponding to the clicking operation of the button and transmits the script to the proxy object via the communication window.

Subsequently, the method 300 proceeds to step S302, wherein by invoking a scheduling interface of the proxy object, the active object enables the proxy object to execute a method of obtaining a scheduling identification of a to-be-executed method in the script, and the proxy object, after obtaining the scheduling identification, returns the scheduling identification to the active object via the communication window. Specifically, first, the independent process parses the script corresponding to the clicking operation of the button, obtains a to-be-executed method in the script to allow the webpage to become black, then schedules a name of the to-be-executed method in the script to an IDispatch interface of the active object, the IDispatch interface is the scheduling interface used to invoke a function in a language program not supporting a virtual function table, the IDispatch interface has a GetIDsOfNames function and an Invoke function, wherein the GetIDsOfNames function provides a method of using the name of the method to return its scheduling ID, and the Invoke function provides an instruction of using the scheduling ID of the method to execute the method. As the webpage corresponding to the active object is an empty webpage, and it does not have a method of enabling the webpage to become black, the active object cannot obtain the scheduling identification (ID) of the method in the script, and the active object invokes the IDispatch interface of the proxy object via the communication window. Since the Web webpage corresponding to the proxy object is a complete webpage, the method provided by the GetIDsOfNames function of the proxy object is invoked to enable the proxy object to obtain the scheduling ID of the to-be-executed method in the script, and then the proxy object returns the scheduling ID to the active object via the communication window.

Then, the method 300 proceeds to step S303, wherein the active object intercepts an instruction in the independent process executing the to-be-executed method in the script and transmits the instruction to the proxy object. Specifically, after the active object obtains the scheduling ID of the to-be-executed method, the scheduling ID is fed back to the webpage, and the independent process will execute an instruction of the Invoke(ID) in next step according to a conventional flow. However, according to the method here, the instruction of Invoke(ID) of the independent process is intercepted, and the instruction of the Invoke(ID) is sent to the proxy object.

Then, the method 300 proceeds to step S304, wherein the proxy object executes the to-be-executed method in the script by executing the instruction, and then returns an execution result to the active object. Specifically, the proxy object executes the instruction of Invoke(ID) so as to execute the to-be-executed method in the script to make the webpage become black, and return a notification message of the effect that the webpage becomes black to the active object.

Figure 4:
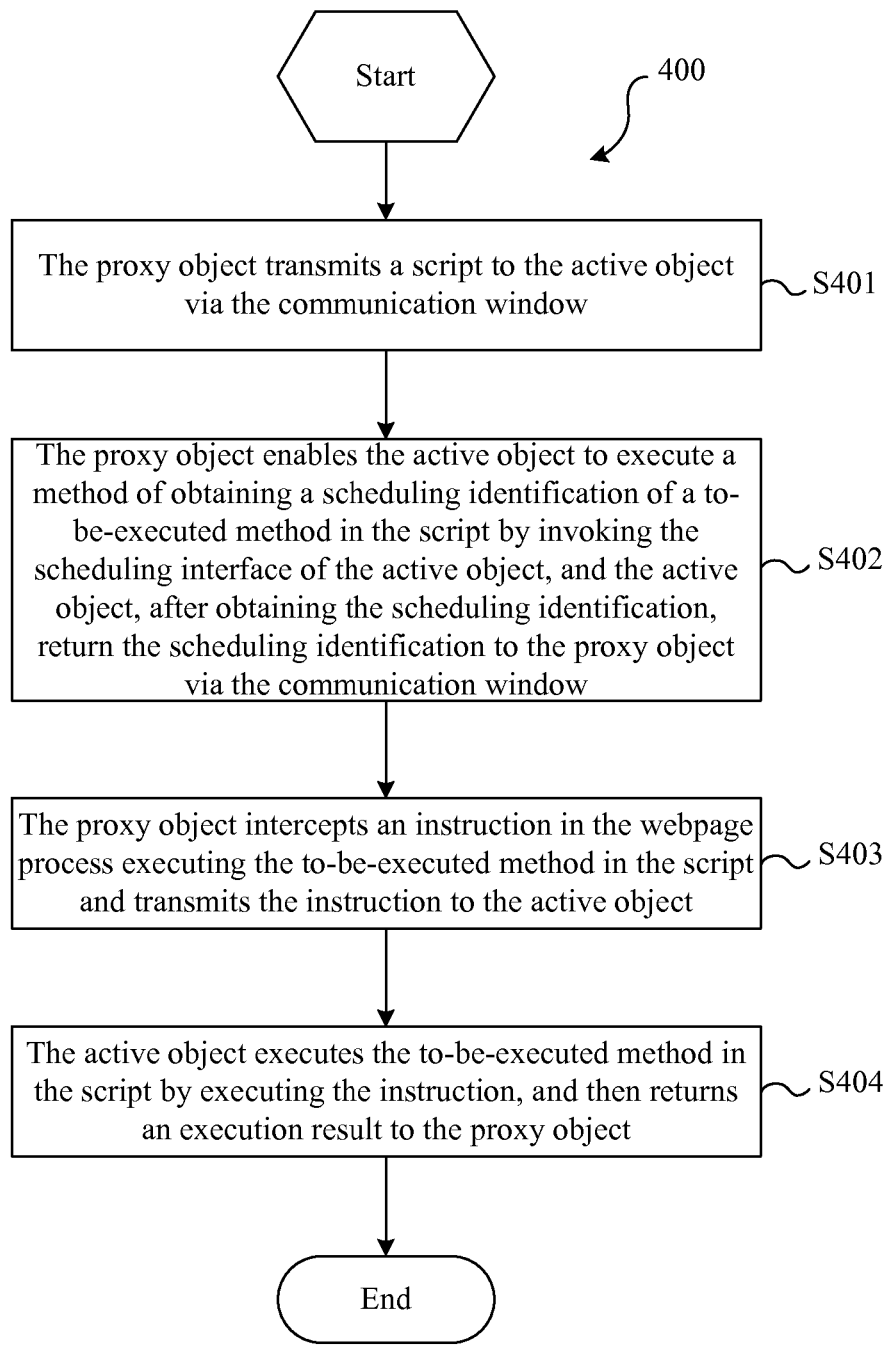
FIG. 4 illustrates a flowchart of a method of the active object executing a script of the proxy object in the present invention.

FIG. 4 illustrates a flowchart of a method 400 of the active object executing a script of the proxy object in the present invention. The method is adapted for the case that the active object running in the independent process executes a script of the proxy object running in the webpage process, i.e., the method is a method of the webpage running in the webpage process controlling the active object in the independent process. If the webpage desires to obtain information of the plug-in (such as attributes like version number, path and URL) or the webpage desires to operate the plug-in (e.g., the webpage desires to change a size of the plug-in window), it can be implemented by this method. As shown in FIG. 4, the method begins with step S401, wherein the proxy object transmits the script to the active object via the communication window. Take obtainment of the version number of the plug-in as an example. Since the proxy object in the webpage process is not a true plug-in object, it does not know the version number of the plug-in, so the proxy object cannot directly feed back the version number of the plug-in to the webpage. After the independent process completes creation of the active object, a variable of the active object is notified to the webpage, a webpage developer writes in the webpage a script for obtaining the version number of the plug-in according to the variable, and the to-be-executed method in the script is intended to obtain the version number of the plug-in. The proxy object transmits the script for obtaining the version number of the plug-in to the active object via the communication window.

Then, the method 400 proceeds to step S402, wherein by invoking a scheduling interface of the active object, the proxy object enables the active object to execute a method of obtaining a scheduling identification of a to-be-executed method in the script, and the active object, after obtaining the scheduling identification, returns the scheduling identification to the proxy object via the communication window. Specifically, first, the webpage parses the script, schedules name of the to-be-executed method in the script to an IDispatch interface of the proxy object, the IDispatch interface is the scheduling interface to invoke a function in a language program not supporting a virtual function table, the IDispatch interface has a GetIDsOfNames function and an Invoke function, wherein the GetIDsOfNames function provides a method of using the name of the method to return its scheduling ID, and the Invoke function provides an instruction of using the scheduling ID of the method to execute the method. Since the proxy object cannot obtain the scheduling identification (ID) of the to-be-executed method in the script, the proxy object invokes the IDispatch interface of the active object via the communication window. The active object is an object of the true plug-in, the method provided by the GetIDsOfNames function of the active object is invoked to enable the active object to obtain the scheduling ID of the to-be-executed method, and then the active object returns the scheduling ID to the proxy object via the communication window.

Then, the method 400 proceeds to step S403, wherein the proxy object intercepts an instruction in the webpage process executing the to-be-executed method in the script and transmits the instruction to the active object. Specifically, after the proxy object obtains the scheduling ID of the to-be-executed method, the scheduling ID is fed back to the webpage, and the webpage process will execute an instruction of the Invoke(ID) in next step according to a conventional flow. However, according to the method here, the instruction of Invoke(ID) of the webpage process is intercepted, and the instruction of the Invoke(ID) is sent to the active object.

Then, the method 400 proceeds to step S404, wherein the active object executes the to-be-executed method in the script by executing the instruction, and then returns an execution result to the proxy object. Specifically, the active object executes the instruction of Invoke(ID) so as to execute the to-be-executed method in the script, obtain the version number of the plug-in, and return the version number of the plug-in to the proxy object, and then the proxy object will feed back the version number of the plug-in to the webpage.

According to the above inter-process script executing method, the proxy object may execute the script of the active object, and the active object may execute the script of the proxy object, thereby achieving control of the webpage running in the webpage process by the active object running in the independent process and control of the active object running in the independent process by the webpage running in the webpage process.

Figure 5:
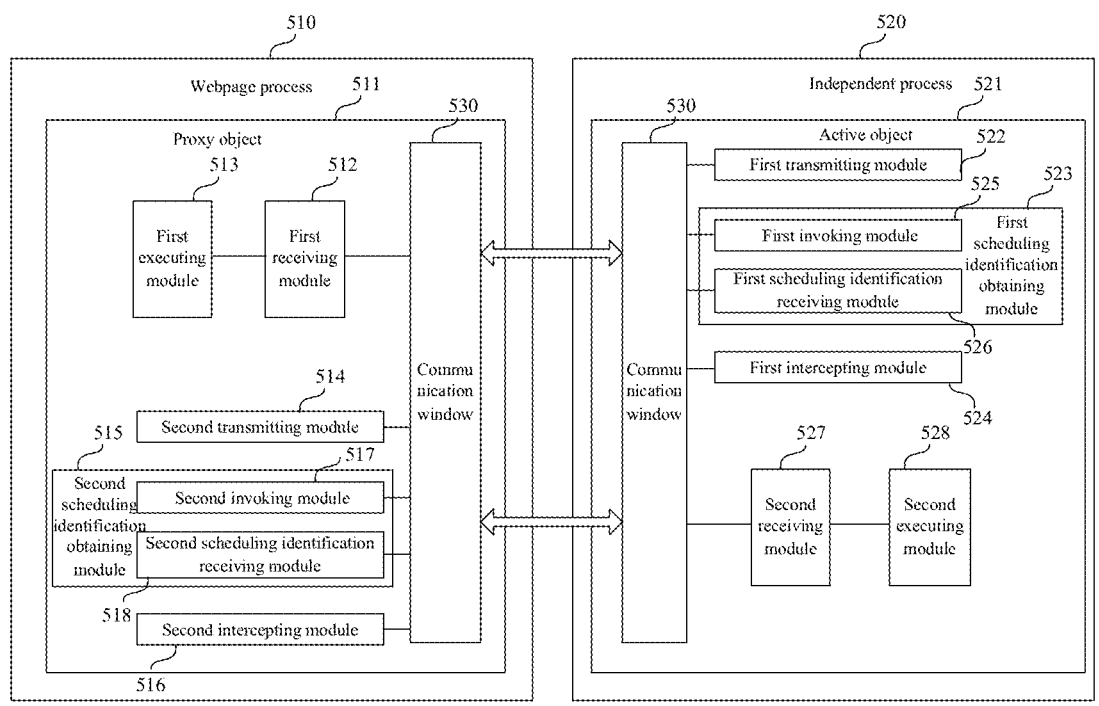
FIG. 5 illustrates a structural block diagram of a system for executing a browser active object according to an embodiment of the present invention.

FIG. 5 illustrates a structural diagram of a system for executing a browser active object according to an embodiment of the present invention. As shown in FIG. 5, the system comprises a webpage process module 510 and an independent process module 520, a proxy object 511 located in the webpage process module 510 and an active object 521 located in the independent process module 520, and a communication window 530 respectively created in the active object 521 and the proxy object 511. In the system, the active object is an active object corresponding to the ActiveX plug-in, and the ActiveX plug-in may be a video play plug-in such as Baidu video or QVOD, but the present invention is not limited to this.

The webpage process module 510 is configured to, before the active object is created, intercept a webpage process to query for a safety interface of a pre-created active object, and return information indicating the active object is a safe plug-in; and intercept a procedure of the webpage process creating an active object, and create a proxy object 511 to replace an active object actually to be created, with the proxy object 511 running in the webpage process. In the case that there is a ActiveX plug-in in the webpage, before the webpage process module 510 creates the ActiveX plug-in, a registration table is firstly queried to look up whether the registration table related to the plug-in declares the safety of a script of the plug-in. Usually, regarding the type of plug-ins such as Baidu video or QVOD, the registration table generally does not declare safety of its script, so after the registration table is queried, the webpage process module 510 pre-creates an active object, determines the safety of the plug-in by querying for a safety interface (IObjectSafety) of the pre-created active object, and truly creates the active object of the plug-in only when the plug-in is determined safe. Regarding the type of plug-ins such as Baidu video or QVOD, if the special processing is not performed here, information about warning or not creating an object will be displayed so that such type of plug-ins cannot operate normally. Therefore, the webpage process module 510 intercepts the IObjectSafety interface for the webpage process to query for the pre-created active object, and directly returns information indicating the plug-in is a safe plug-in. For example, when the webpage process queries for the IObjectSafety interface of the pre-created active object, the webpage process module 501 intercepts the interface, returns to it the IObjectSafety interface indicative of plug-in safety, returns INTERFACESAFE_FOR_UNTRUSTED_CALLER| INTERFACESAFE_FOR_UNTRUSTED_DATA via GetInterfaceSafetyOptions to indicate that the plug-in is safe in script and safe in initialization, and thereby safety verification can be smoothly passed. When the webpage process of the browser creates an active object, the webpage process module 510 intercepts CoGetClassObject, and creates a proxy object 511 to replace the active object actually to be created. The proxy object 511 includes a series of interfaces, including many standard interfaces that will be invoked by an IUnknown pointer, such as IOleObject and IViewObject. Then, when CreateInstance of IClassFactory is invoked, the created proxy object 511 is returned to the IUnknown pointer of the webpage process, whereby creation of the proxy object 511 is completed.

The independent process module 520 is configured to, when the webpage process activates the proxy object 511, create the active object actually to be created in the independent process independent from the webpage process, and run the active object 521 in the independent process. When the webpage process activates the proxy object 511, information related to the plug-in such as attribute, URL and size is extracted, and then an independent process is created. First, a document, namely, an empty webpage, is created, an object is inserted therein, the independent process invokes CoGetClassObject, the independent process module 520 intercepts the CoGetClassObject and creates the active object 521. The active object 521 comprises a series of interfaces, including many standard interfaces that will be invoked by an IUnknown pointer, such as IOleObject and IViewObject. Then, when CreateInstance of IClassFactory is invoked, the created active object 521 is returned to the IUnknown pointer of the independent process, whereby creation of the active object 521 is completed. The active object 521 is an object which truly realizes the plug-in function.

The independent process module 520 is further configured to intercept the independent process querying for the IWeBrowser2 interface, and return a self-created IWeBrowser2 interface so as to create the active object 521 actually to be created.

The active object 521 and the proxy object 511 communicate via the communication window 530 so that the proxy object 511 invokes the active object 521 and/or the active object 521 invokes the proxy object 511. The two objects may interact with respect to size, focus, refresh, script and other information of the plug-in through the two communication windows.

Furthermore, if there is a nested structure in the Web webpage, the webpage process module 510 comprises a plurality of proxy objects, the independent process module 520 comprises a plurality of active objects, there is a one-to-one correspondence between the proxy objects and the active objects, the communication window of the proxy object has a corresponding attribute to the communication window of the active object corresponding to the proxy object, and communication between the active object and the proxy object is achieved through the two communication windows.

In this system, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the ActiveX plug-in is improved.

Furthermore, in the system as shown in FIG. 5, the proxy object 511 and the active object 521 may interact scripts therebetween, i.e., the proxy object 511 may execute the script of the active object 521, and the active object 521 may execute the script of the proxy object 511.

The active object 521 comprises a first transmitting module 522, a first scheduling identification obtaining module 523 and a first intercepting module 524, wherein the first scheduling identification obtaining module 523 further comprises a first invoking module 525 and a first scheduling identification receiving module 526. The proxy object 511 comprises a first receiving module 512 and a first executing module 513.

The first transmitting module 522 is configured to transmit the script to the proxy object 511 via the communication window 530. Taking a user clicking a button created on the plug-in window to trigger the webpage to become black as an example, when the user clicks the button on the plug-in window, the active object 521 of the plug-in obtains a script corresponding to the clicking operation of the button, and the first transmitting module 522 transmits the script to the proxy object 511 via the communication window 530.

The first scheduling identification obtaining module 523 is configured to obtain a scheduling identification of the to-be-executed method in the script by invoking a scheduling interface of the proxy object 511, wherein the first invoking module 525 is configured to invoke the scheduling interface of the proxy object 511 and enable the proxy object 511 to execute a method of obtaining a scheduling identification of the to-be-executed in the script; the first scheduling identification receiving module 256 is configured to receive the scheduling identification returned by the proxy object 511 via the communication window 530. Specifically, first, the independent process module 520 parses the script corresponding to the clicking operation of the button, obtains the to-be-executed method in the script to allow the webpage to become black, and then schedules a name of the to-be-executed method in the script to an IDispatch interface of the active object 521. As the webpage corresponding to the active object 521 is an empty webpage, and it does not have a method of enabling the webpage to become black, the active object 521 cannot obtain the scheduling identification (ID) of the method in the script, and the first scheduling module 525 of the active object 521 invokes the IDispatch interface of the proxy object 511 via the communication window 530. Since the Web webpage corresponding to the proxy object 511 is a complete webpage, the method provided by the GetIDsOfNames function of the proxy object 511 is invoked to enable the proxy object 511 to obtain the scheduling ID of the to-be-executed method in the script, and then the proxy object 511 returns the scheduling ID to the first scheduling identification receiving module 526 of the active object 521 via the communication window 530.

The first intercepting module 524 is configured to intercept an instruction in the independent process executing the to-be-executed method in the script and transmit the instruction to the proxy object 511. After the active object 521 obtains the scheduling ID of the to-be-executed method, the scheduling ID is fed back to the webpage, and the independent process will execute an instruction of the Invoke(ID) in next step according to a conventional flow. However, the first intercepting module 524 intercepts the instruction of Invoke(ID) of the independent process and transmits the instruction of the Invoke(ID) to the proxy object 511.

The first receiving module 512 is configured to receive the script transmitted by the first transmitting module 522 of the active object 521 and the instruction transmitted by the first intercepting module 524; the first executing module 513 is configured to execute the to-be-executed method in the script by executing the instruction and then return an execution result to the active object 521. The first executing module 513 executes the instruction of Invoke(ID) so as to execute the to-be-executed method in the script to make the webpage become black, and return a notification message of the effect that the webpage becomes black to the active object 521.

The proxy object 511 further comprises a second transmitting module 514, a second scheduling identification obtaining module 515, a second intercepting module 516, wherein the second scheduling identification obtaining module 515 further comprises a second invoking module 517 and a second scheduling identification receiving module 518. The active object 521 comprises a second receiving module 527 and a second executing module 528.

The second transmitting module 514 is configured to transmit the script to the active object 521 via the communication window 530. Take obtainment of the version number of the plug-in as an example. Since the proxy object 511 in the webpage process is not a true plug-in object, it does not know the version number of the plug-in, so the proxy object 511 cannot directly feed back the version number of the plug-in to the webpage. After the independent process completes creation of the active object 521, a variable of the active object 521 is notified to the webpage, a webpage developer writes in the webpage a script for obtaining the version number of plug-in according to the variable, and the to-be-executed method in the script is intended to obtain the version number of the plug-in. The second transmitting module 514 of the proxy object 511 transmits the script for obtaining the version number of the plug-in to the active object 521 via the communication window 530.

The second scheduling identification obtaining module 515 is configured to obtain a scheduling identification of the to-be-executed method in the script by invoking the scheduling interface of the active object 521, wherein the second invoking module 517 is configured to invoke the scheduling interface of the active object 521 and enable the active object 521 to execute a method of obtaining a scheduling identification of the to-be-executed in the script; the second scheduling identification receiving module 518 is configured to receive the scheduling identification returned by the active object 521 via the communication window 530. First, the webpage process module 510 parses the script and schedules a name of the to-be-executed method in the script to an IDispatch interface of the proxy object 511. As the proxy object 511 cannot obtain the scheduling identification (ID) of the to-be-executed method in the script, the second scheduling module 517 of the proxy object 511 invokes the IDispatch interface of the active object 521 via the communication window 530. The active object 521 is an object of the true plug-in, the method provided by the GetIDsOfNames function of the active object 521 is invoked to enable the active object 521 to obtain the scheduling ID of the to-be-executed method, and then the active object 521 returns the scheduling ID to the second scheduling identification receiving module 518 of the proxy object 511 via the communication window 530.

The second intercepting module 516 is a configured to intercept an instruction in the webpage process executing the to-be-executed method in the script and transmit the instruction to the active object 521. After the proxy object 511 obtains the scheduling ID of the to-be-executed method, the scheduling ID is fed back to the webpage, and the webpage process will execute an instruction of the Invoke(ID) in next step according to a conventional flow. However, the second intercepting module 516 intercepts the instruction of Invoke (ID) of the webpage process and transmits the instruction of the Invoke(ID) to the active object 521.

The second receiving module 527 is configured to receive the script transmitted by the second transmitting module 514 of the proxy object 511 and the instruction transmitted by the second intercepting module 516; the second executing module 528 is configured to execute the to-be-executed method in the script by executing the instruction and then return an execution result to the proxy object 511.

According to the functions performed by the above function modules, the proxy object may execute the script of the active object, and the active object may execute the script of the proxy object, thereby achieving control of the webpage running in the webpage process by the active object running in the independent process and control of the active object running in the independent process by the webpage running in the webpage process.

The present invention further provides a browse comprising the system for executing a browser active object according to the above embodiment.

The inter-process script executing method provided by the present invention refers to a script executing method between the webpage process and the independent process, wherein the webpage process is a process for running the Web webpage, and the independent process is another process independent from the webpage process. In the case that the webpage has an ActiveX plug-in, the webpage process runs an ActiveX plug-in proxy object, the independent process runs an ActiveX plug-in active object, and the ActiveX plug-in active object is an object of a true ActiveX plug-in. In the following embodiment, illustration is presented by taking a Flash plug-in as the ActiveX plug-in, but the present invention is not limited to this.

Reference may be made to FIG. 2 and the corresponding depictions for a procedure for creating the Flash plug-in proxy object and Flash plug-in active object.

Figure 6:
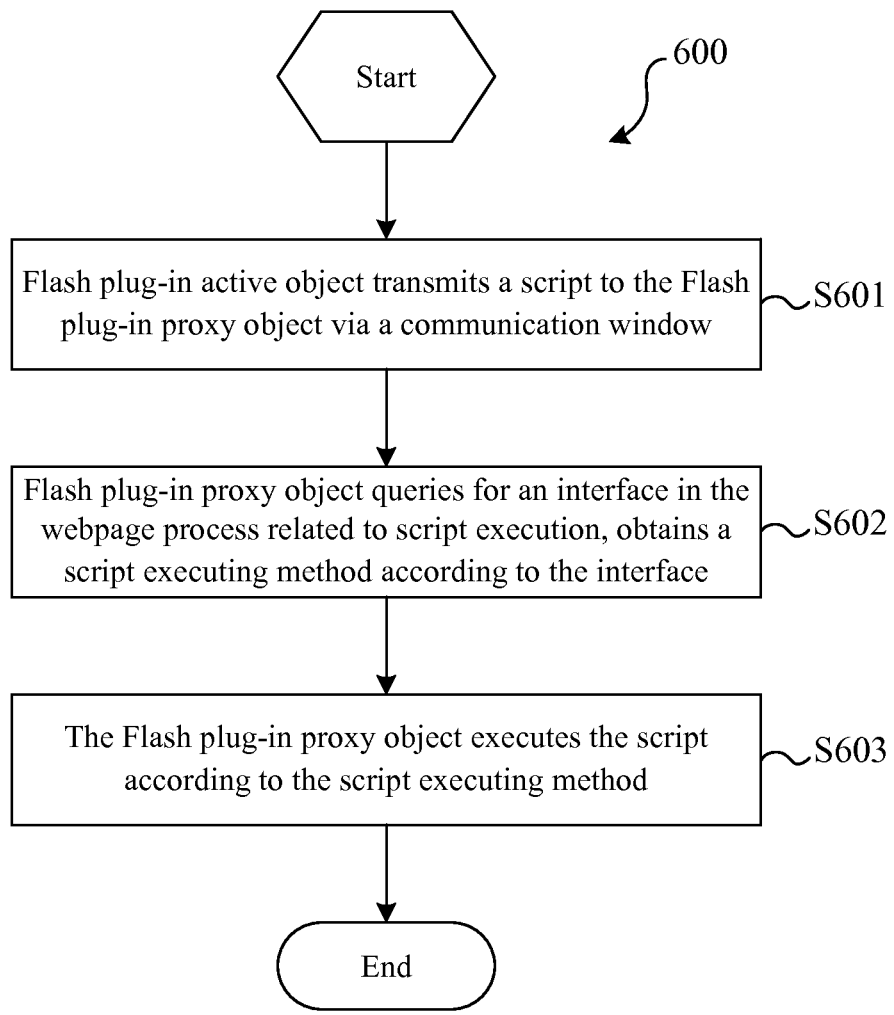
FIG. 6 illustrates a flowchart of an inter-process script executing method according to an embodiment of the present invention.

FIG. 6 illustrates a flowchart of an inter-process script executing method 600 according to an embodiment of the present invention. The method is adapted to the case that the Flash plug-in proxy object run in the webpage process executes a script of the Flash plug-in active object run in the independent process, namely, the method is a method of the Flash plug-in active object run in the independent process controlling the webpage in the webpage process. As shown in FIG. 6, the method 600 begins with step S601, wherein the Flash plug-in active object transmits a script to the Flash plug-in proxy object via the communication window. Taking a user clicking a button created on the Flash to trigger the webpage to become black as an example, when the user clicks the button on the Flash, the Flash plug-in active object obtains a script corresponding to the clicking operation of the button to transmit the script to the Flash proxy object via the communication window.

Then, the method 600 proceeds to step S602, wherein the Flash plug-in proxy object queries for an interface in the webpage process related to script execution, and obtains a script executing method according to the interface. After receiving the script corresponding to a button clicking operation, the Flash plug-in proxy object queries for and obtains an IHTML Window interface in the webpage process, the IHTML Window interface is an interface related to the script execution, and ExecScript in the IHTML Window interface is a function for executing the script, i.e., the ExecScript function provides the script executing method.

Then, the method 600 proceeds to step S603, wherein Flash plug-in proxy object executes the script according to the script executing method. According to the script executing method provided by the ExecScript function, the Flash plug-in proxy object execute the script corresponding to the above button clicking operation to make the webpage become black.

According to the inter-process script executing method provided by the present embodiment, after the active object transmits the script to the proxy object, the proxy object queries for an interface in the webpage process related to script execution, obtains the script executing method according to the interface, and thereby executes the script transmitted by the active object according to the script executing method, thereby achieving script execution between different processes and implementing control of the webpage running in the webpage process by the active object running in the independent process. Furthermore, in this method, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the plug-in is improved.

Figure 7:
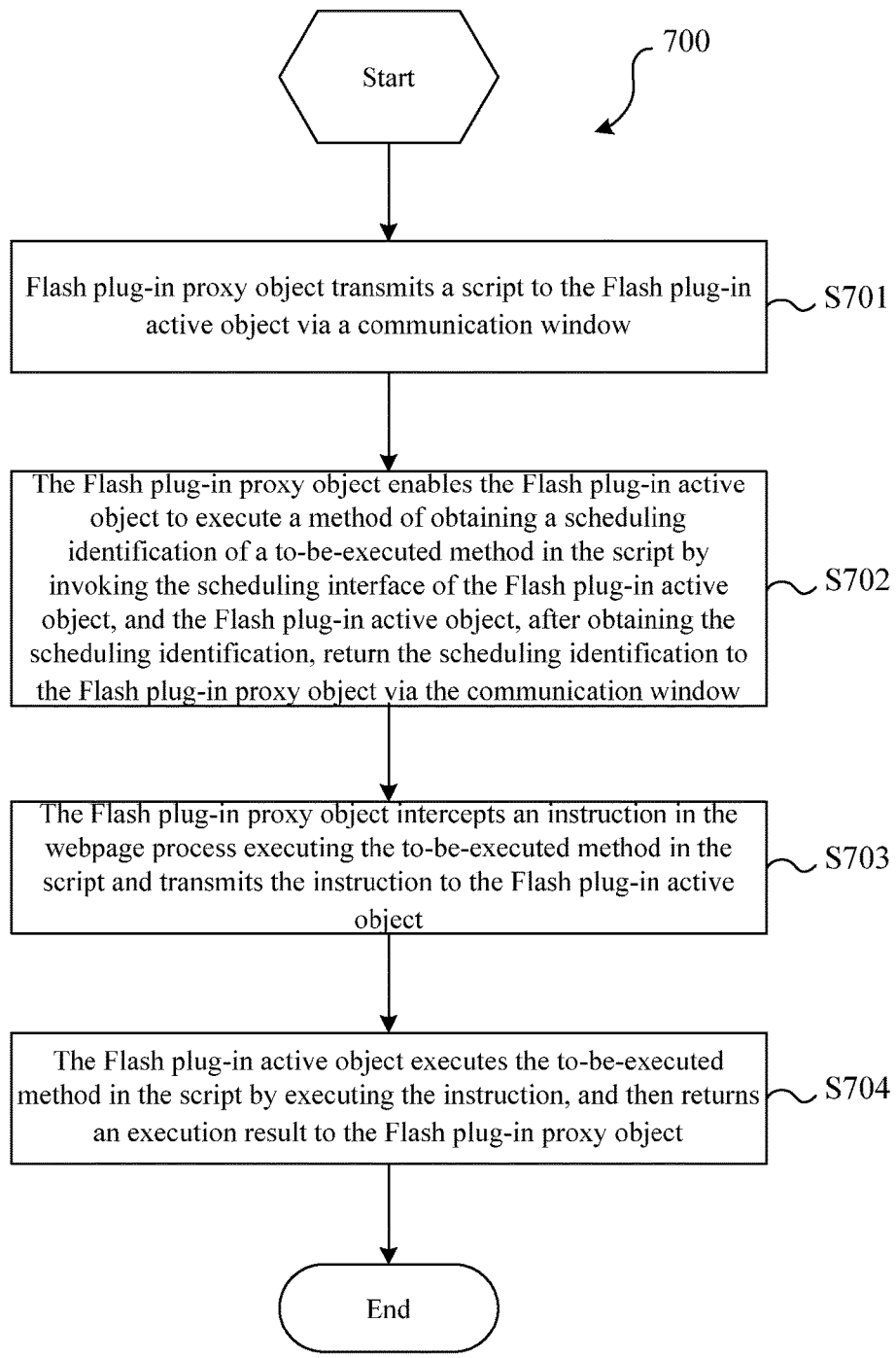
FIG. 7 illustrates a flowchart of an inter-process script executing method according to another embodiment of the present invention.

FIG. 7 illustrates a flowchart of an inter-process script executing method 700 according to another embodiment of the present invention. The method is adapted to the case that the Flash plug-in active object run in the independent process executes a script of the Flash plug-in proxy object run in the webpage process, namely, the method is a method of the webpage run in the webpage process controlling the Flash plug-in active object in the independent process. If the webpage desires to obtain information of the Flash (such as attributes like version number, path and URL) or the webpage desires to operate the Flash (e.g., the webpage desires to change a size of the Flash window), it can be implement by this method.

As shown in FIG. 7, the method 700 begins with step S701, wherein the Flash plug-in proxy object transmits a script to the Flash plug-in active object via the communication window. Take obtainment of the version number of the Flash as an example. Since the Flash plug-in in the webpage process is not a true Flash plug-in, it does not know the version number of the Flash, so the Flash plug-in proxy object cannot directly feed back the version number of the Flash to the webpage. After the independent process completes creation of the Flash plug-in active object, a variable of the Flash plug-in active object is notified to the webpage, a webpage developer writes in the webpage a script for obtaining the version number of Flash according to the variable, and the to-be-executed method in the script is intended to obtain the version number of the Flash. The Flash plug-in proxy object transmits the script for obtaining the version number of the Flash to the Flash plug-in active object via the communication window.

Then, the method 700 proceeds to step S702, wherein by invoking a scheduling interface of the Flash plug-in active object, the Flash plug-in proxy object enables the Flash plug-in active object to execute a method of obtaining a scheduling identification of a to-be-executed method in the script, and the Flash plug-in active object, after obtaining the scheduling identification, returns the scheduling identification to the Flash plug-in proxy object via the communication window. Specifically, first, the webpage parses the script, schedules a name of the to-be-executed method in the script to an IDispatch interface of the Flash plug-in proxy object, the IDispatch interface is the scheduling interface to invoke a function in a language program not supporting a virtual function table, the IDispatch interface has a GetIDsOfNames function and an Invoke function, wherein the GetIDsOfNames function provides a method of using the name of the method to return its scheduling ID, and the Invoke function provides an instruction of using the scheduling ID of the method to execute the method. Since the Flash plug-in proxy object cannot obtain the scheduling identification (ID) of the to-be-executed method in the script, the Flash plug-in proxy object invokes the IDispatch interface of the Flash plug-in active object via the communication window. The Flash plug-in active object is an object of the true Flash plug-in, the method provided by the GetIDsOfNames function of the Flash plug-in active object is invoked to enable the Flash plug-in active object to obtain the scheduling ID of the to-be-executed method, and then the Flash plug-in active object returns the scheduling ID to the Flash plug-in proxy object via the communication window.

Then, the method 700 proceeds to step S703, wherein Flash plug-in proxy object intercepts an instruction in the webpage process executing the to-be-executed method in the script and transmit the instruction to the Flash plug-in active object. Specifically, after the Flash plug-in proxy object obtains the scheduling ID of the to-be-executed method, the scheduling ID is fed back to the webpage, and the webpage process will execute an instruction of the Invoke(ID) in next step according to a conventional flow. However, according to the method here, the instruction of Invoke(ID) of the webpage process is intercepted, and the instruction of the Invoke(ID) is sent to the Flash plug-in active object.

Then, the method 700 proceeds to step S704, wherein the Flash plug-in active object executes the to-be-executed method in the script by executing the instruction, and then returns an execution result to the Flash plug-in proxy object. Specifically, the Flash plug-in active object executes the instruction of Invoke(ID) so as to execute the to-be-executed method in the script, obtain the version number of the Flash, and return the version number of the Flash to the Flash plug-in proxy object, and then the Flash plug-in proxy object will feed back the version number of the Flash to the webpage.

According to the inter-process script executing method provided by the present embodiment, after the proxy object transmits the script to the active object, the proxy object invokes the scheduling interface of the active object and obtain the scheduling ID of the to-be-executed method in the script; after the proxy object feeds back the scheduling ID to the webpage, the proxy object intercepts an instruction in the webpage process executing the to-be-executed method in the script and transmits the instruction to the active object, the active object executes the instruction and returns an execution result resulting from the execution of the instruction to the proxy object, thereby achieving script execution between different processes and implementing control of the active object running in the independent process by the webpage running in the webpage process. Furthermore, in this method, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the plug-in is improved.

Figure 8:
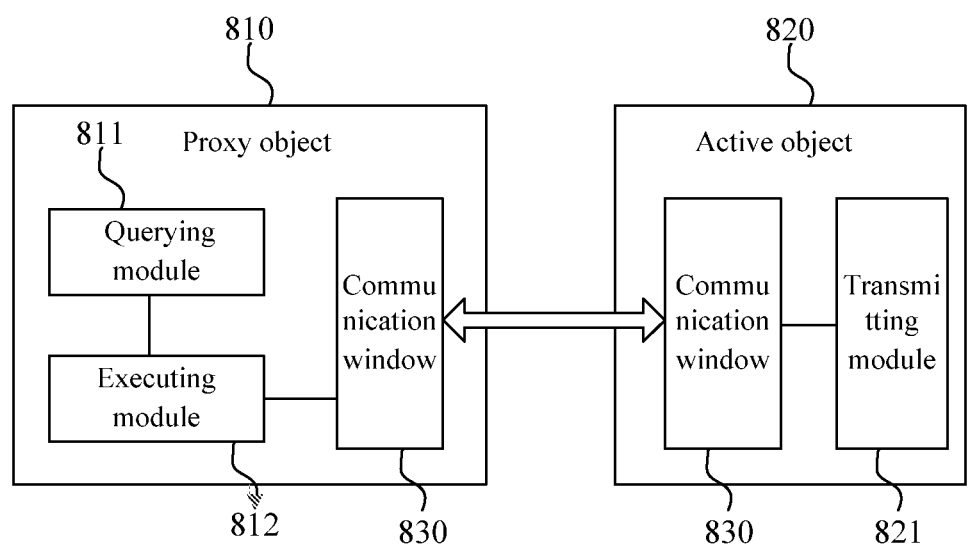
FIG. 8 illustrates a structural block diagram of an inter-process script executing system according to an embodiment of the present invention.

FIG. 8 illustrates a structural block diagram of an inter-process script executing system according to an embodiment of the present invention. As shown in FIG. 8, the system comprises: a proxy object 810 running in a webpage process, an active object 820 running in an independent process and a pair of communication windows 830 respectively created in the proxy object 810 and the active object 820. The system is adapted to the case that the proxy object 810 executes a script of the active object 820, and the proxy object 810 and active object 820 communicate via the pair of communication windows 830.

The active object 820 comprises a transmitting module 821 which is configured to transmit the script to the proxy object 810 via the communication window 830. Taking a user clicking a button created on the Flash to trigger the webpage to become black as an example, when the user clicking the button on the Flash, the active object 820 obtains a script corresponding to the clicking operation of the button, and the transmitting module 821 transmits the script to the proxy object 810 via the communication window 830.

The proxy object 810 comprises: a query module 811 and an executing module 812. The query module 811 is configured to query for an interface related to script execution in the webpage process, and obtain a script executing method according to the interface; the executing module 812 is configured to execute the script according to the script executing method. After the proxy object 810 receives the script corresponding to a button clicking operation, the query module 811 queries for and obtains an IHTML Window interface in the webpage process, the IHTML Window interface is an interface related to the script execution, and ExecScript in the IHTML Window interface is a function for executing the script, i.e., the ExecScript function provides the script executing method. The executing module 812 executes the script corresponding to the above button clicking operation according to the script executing method provided by the ExecScript function to make the webpage become black.

The proxy object 810 running in the webpage process is created in place of the active object actually to be created by intercepting a procedure of the webpage process of the browser creating an active object; the active object 820 running in the independent process is created in the independent process independent from the webpage process when the webpage process activates the proxy object 810; the pair of communication windows 830 respectively created in the active object 820 and the proxy object 810 are used to enable the active object 820 and the proxy object 810 to communicate.

Furthermore, there are a plurality of proxy objects running in the webpage process, there are a plurality of active objects running in the independent process, there is a one-to-one correspondence between the proxy objects and the active objects, the communication window of the proxy object has a corresponding attribute with the communication window of the active object corresponding to the proxy object, and communication between the active object and the proxy object is achieved through the pair of communication windows.

According to the inter-process script executing system provided by the present embodiment, after the active object transmits the script to the proxy object, the proxy object queries for an interface related to script execution in the webpage process, and obtain a script executing method according to the interface, and thereby executes the script transmitted from the active object according to the script executing method, thereby achieving script execution between different processes and implementing control of the webpage running in the webpage process by the active object running in the independent process. Furthermore, in this system, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the plug-in is improved.

Figure 9:
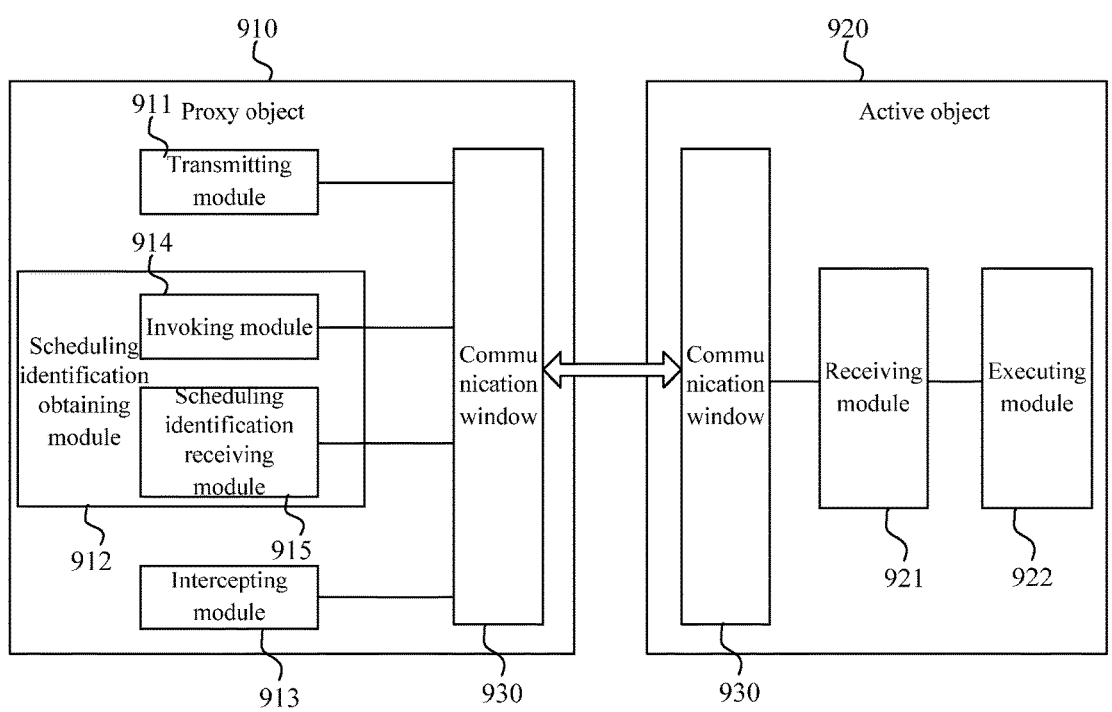
FIG. 9 illustrates a structural block diagram of an inter-process script executing system according to another embodiment of the present invention.

FIG. 9 illustrates a structural block diagram of an inter-process script executing system according to another embodiment of the present invention. As shown in FIG. 9, the system comprises: a proxy object 910 running in a webpage process, an active object 920 running in an independent process and a pair of communication windows 930 respectively created in the proxy object 910 and the active object 920. The system is adapted to the case that the active object 920 executes a script in the webpage process, and the proxy object 910 and active object 920 communicate via the pair of communication windows 930.

The proxy object 910 comprises a transmitting module 911, a scheduling identification obtaining module 912 and an intercepting module 913.

The transmitting module 911 is configured to transmit the script to the active object 920 via the communication window. After the independent process completes creation of the active object 920, a variable of the active object 920 is notified to the webpage, a webpage developer writes a script into the webpage according to the variable, and the transmitting module 911 transmits the script to the active object 920 via the communication window 930.

The scheduling identification obtaining module 912 is configured to obtain a scheduling identification of the to-be-executed method in the script by invoking a scheduling interface of the active object 920. Furthermore, the scheduling identification obtaining module 912 comprises an invoking module 914 and a scheduling identification receiving module 915, the invoking module 914 is configured to invoke the scheduling interface of the active object 920 and enable the active object 920 to execute a method of obtaining a scheduling identification of the to-be-executed in the script to obtain the scheduling identification; the scheduling identification receiving module 915 is configured to receive the scheduling identification returned by active object 920 via the communication window 930. Specifically, first, the webpage parses the script and schedules a name of the to-be-executed method in the script to an IDispatch interface of the proxy object 910, the IDispatch interface is the scheduling interface to invoke a function in a language program not supporting a virtual function table, the IDispatch interface has a GetIDsOfNames function and an Invoke function, wherein the GetIDsOfNames function provides a method of using the name of the method to return its scheduling ID, and the Invoke function provides an instruction of using the scheduling ID of the method to execute the method. As the proxy object 910 cannot obtain the scheduling identification (ID) of the to-be-executed method in the script, the scheduling module 914 invokes the IDispatch interface of the active object 920 via the communication window 930. The active object 920 is an object of the true plug-in, the method provided by the GetIDsOfNames function of the active object 920 is invoked to enable the active object 920 to obtain the scheduling ID of the to-be-executed method, and then the active object 920 returns the scheduling ID to the scheduling identification receiving module 915 via the communication window 930.

The intercepting module 913 is configured to intercept an instruction in the webpage process executing the to-be-executed method in the script and transmit the instruction to the active object 920. After the proxy object 910 obtains the scheduling ID of the to-be-executed method, the scheduling ID is fed back to the webpage, and the webpage process will execute an instruction of the Invoke(ID) in next step according to a conventional flow. However, the intercepting module 913 intercepts the instruction of Invoke(ID) of the webpage process and transmits the instruction of the Invoke (ID) to the active object 920.

The active object 920 comprises: a receiving module 921 and an executing module 922. The receiving module 921 is configured to receive the script transmitted by the transmitting module 911 of the proxy object 910 and the instruction transmitted by the intercepting module 913; the executing module 922 is configured to execute the to-be-executed method in the script by executing the instruction and then return an execution result to the proxy object 910. The executing module 922 executes the instruction of Invoke (ID) so as to execute the to-be-executed method in the script, and returns the execution result to the proxy object 910, and then the proxy object 910 will feed back the execution result to the webpage.

The proxy object 910 running in the webpage process is created in place of the active object actually to be created by intercepting a procedure of the webpage process of the browser creating an active object; the active object 920 running in the independent process is created in the independent process independent from the webpage process when the webpage process activates the proxy object 910; the pair of communication windows 930 respectively created in the active object 920 and the proxy object 910 are used to enable the active object 920 and the proxy object 910 to communicate.

Furthermore, there are a plurality of proxy objects running in the webpage process, there are a plurality of active objects running in the independent process, there is a one-to-one correspondence between the proxy objects and the active objects, the communication window of the proxy object has a corresponding attribute to the communication window of the active object corresponding to the proxy object, and communication between the active object and the proxy object is achieved through the pair of communication windows.

According to the inter-process script executing system provided by the present embodiment, after the proxy object transmits the script to the active object, the proxy object invokes the scheduling interface of the active object and obtain the scheduling ID of the to-be-executed method in the script; after the proxy object feeds back the scheduling ID to the webpage, the proxy object intercepts an instruction in the webpage process executing the to-be-executed method in the script and transmits the instruction to the active object, the active object executes the instruction and returns an execution result resulting from the execution of the instruction to the proxy object, thereby achieving script execution between different processes and implementing control of the active object running in the independent process by the webpage running in the webpage process. Furthermore, in this system, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the plug-in is improved.

The present invention further provides a browse comprising any inter-process script executing system as described in the above embodiment.

Figure 10:
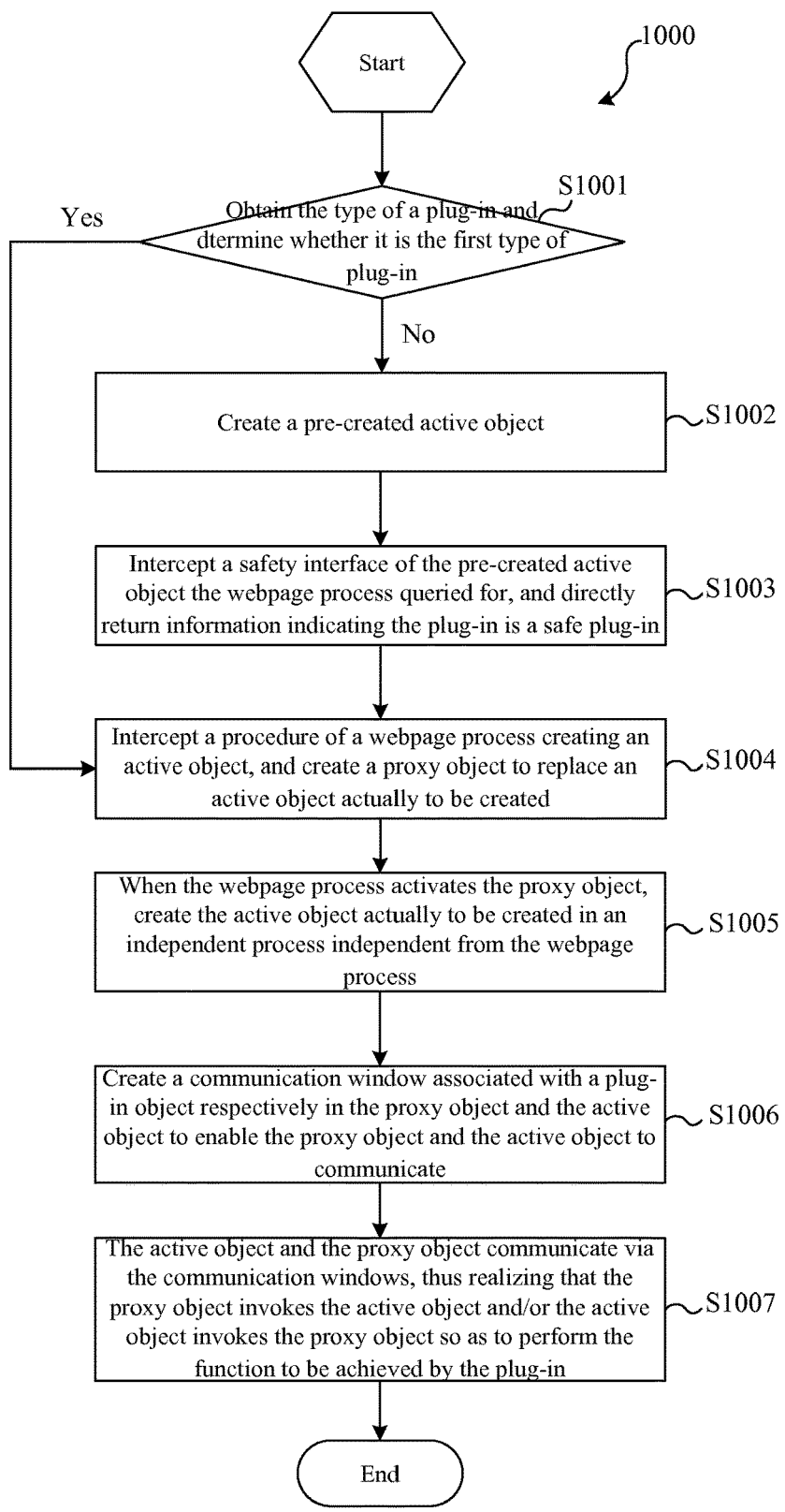
FIG. 10 illustrates a flowchart of a method for executing a browser active object according to an embodiment of the present invention.

FIG. 10 illustrates a flowchart of a method 1000 for executing a browser active object according to an embodiment of the present invention. In the method, the active object is an object corresponding to the ActiveX plug-in. As shown in FIG. 10, the method 1001 begins with step S1001, wherein before the active object is created, the type of the plug-in is obtained. Specifically, in the case that there is a ActiveX plug-in in the webpage, before the webpage process of the browser creates the ActiveX plug-in, a registration table is firstly queried to look up whether the registration table related to the plug-in declares the safety of a script of the plug-in. In the text here, plug-ins whose script safety has already been declared in the registration table are called the first type of plug-ins, e.g., a Flash plug-in belongs to the first type of plug-in; plug-ins whose script safety is not declared in the registration table are called the second type of plug-ins, e.g., a video play plug-in such as Baidu video or QVOD belongs to the second type of plug-in. Therefore, the type of the current plug-in can be known according to whether the registration table declares the safety of the script of the plug-in. If the current plug-in is the first type of plug-in, the flow will skip to step S1004; if the current plug-in is the second type of plug-in, step S1002 will be executed.

In step S1002, regarding the second type of plug-in, after the query is performed to the registration table, a pre-created active object is created.

After step S1002, the method 1000 proceeds to step S1003, a safety interface (IObjectSafety interface) of the pre-created active object the webpage process queried for is intercepted, and information indicating the plug-in is a safe plug-in is directly returned. Regarding the plug-in whose script safety is not declared in the registration table, the safety of the plug-in is determined by querying for the IObjectSafety of the pre-created active object of the plug-in, and the active object of the plug-in is truly created only when the plug-in is determined safe. Regarding the second type of plug-ins, if special processing is not performed here, information about warning or not creating an object will be displayed so that such type of plug-ins cannot operate normally. Therefore, when the webpage process queries for the IObjectSafety interface of the pre-created active object, the interface is intercepted, the IObjectSafety interface indicative of plug-in safety is returned thereto, INTERFACESAFE_FOR_UNTRUSTED_CALLER| INTERFACESAFE_FOR_UNTRUSTED_DATA is returned via GetInterfaceSafetyOptions to indicate that the plug-in is safe in script and safe in initialization, and thereby safety verification can be smoothly passed.

Referring to the above FIG. 2, a Web webpage and a proxy object run in the webpage process, and an empty webpage and an active object run in an independent process. Subsequent steps are further introduced below in detail with reference to FIG. 2.

After step S1003, the method 1000 proceeds to step S1004, wherein a procedure of a webpage process creating an active object is intercepted, a proxy object is created to replace an active object actually to be created, and the proxy object runs in the webpage process. Specifically, when the webpage process of the browser creates an active object, CoGetClassObject is intercepted, and a proxy object is created to replace the active object actually to be created. The proxy object includes a series of interfaces, including many standard interfaces that will be invoked by an IUnknown pointer, such as IOleObject and IViewObject. Then, when CreateInstance of IClassFactory is invoked, the created proxy object is returned to the IUnknown pointer of the webpage process, whereby creation of the proxy object is completed.

Then, the method 1000 proceeds to step S1005, wherein when the webpage process activates the proxy object, the active object actually to be created is created in an independent process independent from the webpage process, and the active object is run in the independent process. Specifically, when the webpage process activates the proxy object, information related to the plug-in such as attribute, URL and size is extracted, and then an independent process is created. First, a document, namely, an empty webpage, is created, an object is inserted therein, the independent process invokes CoGetClassObject, intercepts the CoGetClassObject and creates an active object. The active object comprises a series of interfaces, including many standard interfaces that will be invoked by an IUnknown pointer, such as IOleObject and IViewObject. Then, when CreateInstance of IClassFactory is invoked, the created active object is returned to the IUnknown pointer of the independent process, whereby creation of the active object is completed. The active object is an object which truly realizes the plug-in function.

During creation of the active object, the active object can still be normally created in the case that IWeBrowser2 interface may not be implemented for the first type off plug-ins. However, regarding the second type of plug-ins, creation of the active object will fail if the IWeBrowser2 interface is not implemented. The IWeBrowser 2 is implemented mainly to perform functions such as skipping (Navigate method), obtainment of an URL (Get_LocationURL method) and obtainment of a webpage (IHtmlDocument interface under get_document method). In order to perform these functions, when the plug-in is the second type of plug-in, the independent process queries for the IWeBrowser2 interface, it is intercepted, and then a self-created IWeBrowser2 interface is returned so as to create the active object of the above second type of plug-ins.

Then, the method 1000 proceeds to step S1006, wherein a communication window associated with a plug-in object is created respectively in the proxy object and the active object to enable the proxy object and the active object to communicate. Through the two communication windows, the two objects may interact with respect to size, focus, refresh, script and other information of the plug-in.

Then, the method 1000 proceeds to step S1007, wherein the active object and the proxy object communicate via the communication windows so that the proxy object invokes the active object and/or the active object invokes the proxy object so as to perform the function to be achieved by the plug-in.

Furthermore, if there is a nested structure in the Web webpage, i.e., the parent process runs a plurality of parent webpages and a plurality of subpages. Whenever the webpage process creates a subpage and its proxy object, a proxy object ID (may also include its URL) of the subpage and a proxy object ID (may also include its URL) of the subpage's parent webpage are sent to the independent process in which an active object is created according to a corresponding hierarchical structure. In this case, a plurality of proxy objects run in the webpage process, a plurality of active objects run in the dependent process, there is a one-to-one correspondence between the proxy and the active objects, the communication window of each proxy object has a corresponding attribute with the communication window of the active object corresponding to the proxy object, and communication between the active object and its corresponding proxy object is achieved through the two communication windows.

In this method, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the ActiveX plug-in is improved. Furthermore, the method is compatible with all ActiveX plug-ins, including plug-ins whose script safety is declared in the registration table and plug-ins whose script safety is not declared in the registration table.

In the above method, since the true ActiveX plug-in is separate from the webpage process, when a plug-in window is expected to be displayed in the original Web webpage, a plug-in window corresponding to the active object may be arranged at a location of the plug-in window of the original Web webpage, and the plug-in window corresponding to the active object may move and zoom without affecting the Web webpage.

According to the method provided by the above embodiment, when the Web webpage rolls, the plug-in window may not roll therewith. Specifically, according to the current operation, when the Web webpage rolls, a GetWindow method of an IOleWindow interface of the active object will be invoked to judge whether the active object has a corresponding window, a WM_MOVE message is sent to move the window if there is the window. However, according to the present invention, a null value can be returned when the GetWindow method of the IOleWindow interface of the active object is invoked so that the window will not roll therewith.

Furthermore, on the basis that the proxy object and the active object are created as stated above, the communication between the active object and the proxy object comprises an inter-process script executing procedure. The script executing procedure comprises a procedure of the proxy object executing a script of the active object, and a procedure of the active object executing a script of the proxy object, which will be introduced respectively below.

Reference may be made to FIG. 6 which illustrates a flowchart of a method 600 of the proxy object executing the script of the active object according to the present invention.

Figure 11:
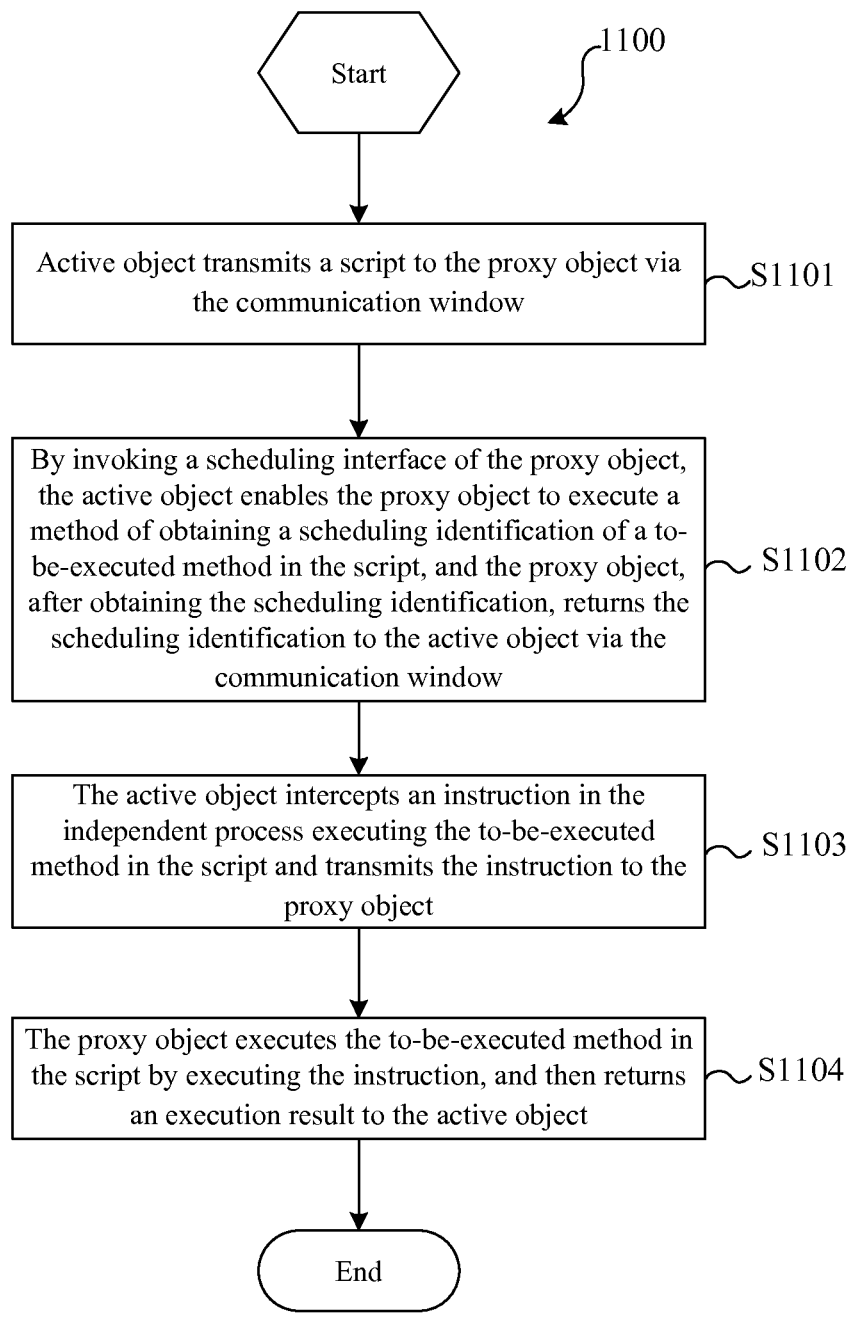
FIG. 11 illustrates a flowchart of a method of a proxy object executing a script of the active object in the present invention.

FIG. 11 illustrates a flowchart of a method 1100 of a proxy object executing a script of the active object in the present invention. The method is adapted for the case that the proxy object of the second type of plug-in executes a script of the active object, i.e., the method is a method of the active object of the second type of plug-in running in the independent process controlling the webpage in the webpage process. As shown in FIG. 11, the method 1100 begins with step S1101, wherein the active object transmits the script to the proxy object via the communication window. Taking a user clicking a button created on the plug-in window to trigger the webpage to become black as an example, when the user clicks the button on the plug-in window, the active object of the plug-in obtains a script corresponding to the clicking operation of the button and transmits the script to the proxy object via the communication window.

Subsequently, the method 1100 proceeds to step S1102, wherein by invoking a scheduling interface of the proxy object, the active object enables the proxy object to execute a method of obtaining a scheduling identification of a to-be-executed method in the script, and the proxy object, after obtaining the scheduling identification, returns the scheduling identification to the active object via the communication window. Specifically, first, the independent process parses the script corresponding to the clicking operation of the button, obtains a to-be-executed method in the script to allow the webpage to become black, then schedules a name of the to-be-executed method in the script to an IDispatch interface of the active object, the IDispatch interface is the scheduling interface used to invoke a function in a language program not supporting a virtual function table, the IDispatch interface has a GetIDsOfNames function and an Invoke function, wherein the GetIDsOfNames function provides a method of using the name of the method to return its scheduling ID, and the Invoke function provides an instruction of using the scheduling ID of the method to execute the method. As the webpage corresponding to the active object is an empty webpage, and it does not have a method of enabling the webpage to become black, the active object cannot obtain the scheduling identification (ID) of the method in the script, and the active object invokes the IDispatch interface of the proxy object via the communication window. Since the Web webpage corresponding to the proxy object is a complete webpage, the method provided by the GetIDsOfNames function of the proxy object is invoked to enable the proxy object to obtain the scheduling ID of the to-be-executed method in the script, and then the proxy object returns the scheduling ID to the active object via the communication window.

Then, the method 1100 proceeds to step S1103, wherein the active object intercepts an instruction in the independent process executing the to-be-executed method in the script and transmits the instruction to the proxy object. Specifically, after the active object obtains the scheduling ID of the to-be-executed method, the scheduling ID is fed back to the webpage, and the independent process will execute an instruction of the Invoke(ID) in next step according to a conventional flow. However, according to the method here, the instruction of Invoke(ID) of the independent process is intercepted, and the instruction of the Invoke(ID) is sent to the proxy object.

Then, the method 1100 proceeds to step S1104, wherein the proxy object executes the to-be-executed method in the script by executing the instruction, and then returns an execution result to the active object. Specifically, the proxy object executes the instruction of Invoke(ID) so as to execute the to-be-executed method in the script to make the webpage become black, and return a notification message of the effect that the webpage becomes black to the active object.

Reference may be made to FIG. 7 which illustrates a flowchart of a method 700 of the active object executing the script of the proxy object according to the present invention.

Figure 12:
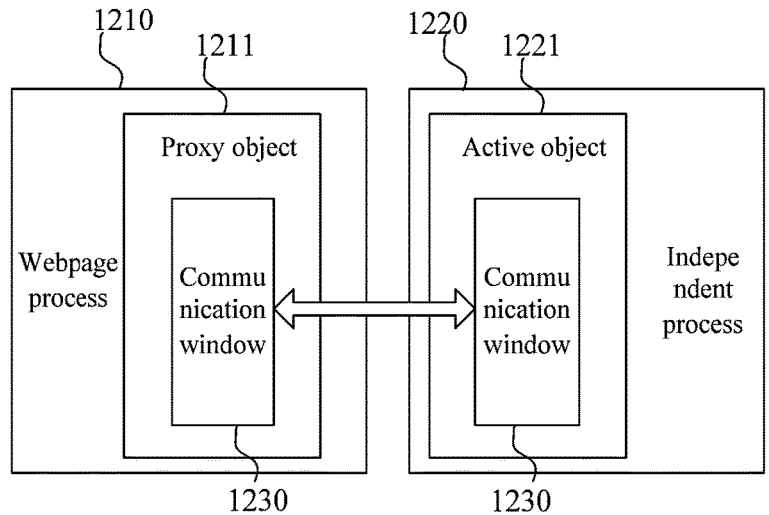
FIG. 12 illustrates a structural block diagram of a system for executing a browser active object according to an embodiment of the present invention.

FIG. 12 illustrates a structural block diagram of a system for executing a browser active object according to an embodiment of the present invention. As shown in FIG. 12, the system comprises a webpage process module 1210 and an independent process module 1220, a proxy object 1211 located in the webpage process module 1210 and an active object 1221 located in the independent process module 1220, and a communication window 1230 respectively created in the active object 1221 and the proxy object 1211. In the system, the active object is an active object corresponding to the ActiveX plug-in, and the ActiveX plug-in may be a video play plug-in such as Baidu video or QVOD, but the present invention is not limited to this.

The webpage process module 1210 is configured to, before the active object is created, obtain the type of the plug-in; and intercept a procedure of the webpage process creating an active object, and create a proxy object 1211 to replace an active object actually to be created according to the type of the plug-in, with the proxy object 1211 running in the webpage process. In the case that there is a ActiveX plug-in in the webpage, before the webpage process module 1210 creates the ActiveX plug-in, a registration table is firstly queried to look up whether the registration table related to the plug-in declares the safety of a script of the plug-in. If the registration table already declares the safety of the script of the plug-in, it is obtained that the plug-in is the first type of plug-in, e.g., a Flash plug-in belongs to the first type of plug-in; if the registration table does not declare the safety of the script of the plug-in, it is obtained that the plug-in is the second type of plug-in, e.g., a video play plug-in such as Baidu video or QVOD belongs to the second type of plug-in.

If the plug-in is determined as the second type of plug-in according to the type of the plug-in, the webpage process module 1210 is further configured to intercept the webpage process to query for the safety interface of the pre-created active object, and return information indicating the second type of plug-in is a safe plug-in. Regarding the second type of plug-in, after the query is performed to the registration table, a pre-created active object is created. When the webpage process module 1210 queries for the IObjectSafety interface of the pre-created active object, the webpage process module intercepts the interface, returns to it the IObjectSafety interface indicative of plug-in safety, returns INTERFACESAFE_FOR_UNTRUSTED_CALLER| INTERFACESAFE_FOR_UNTRUSTED_DATA via GetInterfaceSafetyOptions to indicate that the plug-in is safe in script and safe in initialization, and thereby safety verification can be smoothly passed.

When the webpage process of the browser creates an active object, the webpage process module 1210 intercepts CoGetClassObject, and creates a proxy object 1211 to replace the active object actually to be created. The proxy object 1211 includes a series of interfaces, including many standard interfaces that will be invoked by an IUnknown pointer, such as IOleObject and IViewObject. Then, when CreateInstance of IClassFactory is invoked, the created proxy object 1211 is returned to the IUnknown pointer of the webpage process, whereby creation of the proxy object 1211 is completed.

The independent process module 1220 is configured to, when the webpage process activates the proxy object 1211, create the active object 1211 actually to be created in the independent process independent from the webpage process according to the type of the plug-in, and run the active object 1221 in the independent process. When the webpage process activates the proxy object 1211, information related to the plug-in such as attribute, URL and size is extracted, and then an independent process is created. First, a document, namely, an empty webpage, is created, an object is inserted therein, the independent process invokes CoGetClassObject, the independent process module 1220 intercepts the CoGetClassObject and creates the active object 1221. The active object 1221 comprises a series of interfaces, including many standard interfaces that will be invoked by an IUnknown pointer, such as IOleObject and IViewObject. Then, when CreateInstance of IClassFactory is invoked, the created active object 1221 is returned to the IUnknown pointer of the independent process, whereby creation of the active object 1221 is completed. The active object 1221 is an object which truly realizes the plug-in function.

If the plug-in is determined as the second type of plug-in according to the type of the plug-in, the independent process module 1220 is further configured to intercept the independent process querying for the IWeBrowser2 interface, and return a self-created IWeBrowser2 interface so as to create the active object 1221 actually to be created.

The active object 1221 and the proxy object 1211 communicate via the communication window 1230 so that the proxy object 1211 invokes the active object 1221 and/or the active object 1221 invokes the proxy object 1211. The two objects may interact with respect to a size, focus, refresh, script and other information of the plug-in through the two communication windows.

Furthermore, if there is a nested structure in the Web webpage, the webpage process module 1210 comprises a plurality of proxy objects, the independent process module 1220 comprises a plurality of active objects, there is a one-to-one correspondence between the proxy objects and the active objects, the communication window of the proxy object has a corresponding attribute to the communication window of the active object corresponding to the proxy object, and communication between the active object and the proxy object is achieved through the two communication windows.

In this system, with the proxy object running in the webpage process and the active object running in the independent process, a true ActiveX plug-in is made separate from the webpage process so that the ActiveX plug-in, when there is something wrong, will not affect the webpage process, and thereby improving stability of the browser; particularly when the ActiveX plug-in is confronted with a security issue such as occurrence of viruses, it will not exert an influence on the webpage process, thereby improving the safety of the browser; meanwhile, the webpage process, when being confronted with a problem, will not affect normal run of the ActiveX plug-in so that the stability of the ActiveX plug-in is improved. Furthermore, the method is compatible with all ActiveX plug-ins, including plug-ins whose script safety is declared in the registration table and plug-ins whose script safety is not declared in the registration table.

Figure 13:
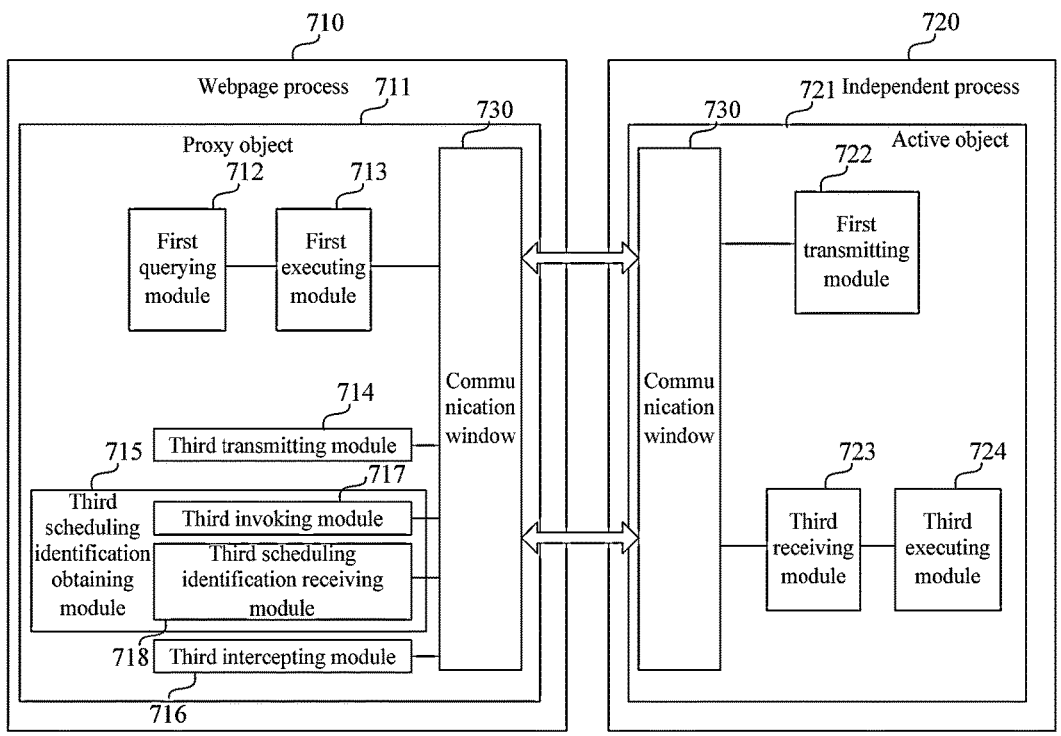
FIG. 13 illustrates a structural block diagram of a system for executing a browser active object according to another embodiment of the present invention.

FIG. 13 illustrates a structural block diagram of a system for executing a browser active object according to another embodiment of the present invention. On the basis of the system as shown in FIG. 12, the proxy object 1311 located in the webpage process module 1310 and the active object 1321 located in the independent process module 1320 in the system may interact scripts therebetween, i.e., the proxy object 1311 may execute the script of the active object 1321, and the active object 1321 may execute the script of the proxy object 1311. The proxy object 1311 and the active object 13211 in the system as shown in FIG. 13 are created when the webpage process module 1310 knows that the plug-in is the first type of plug-in.

The active object 1321 comprises a first transmitting module 1322. The proxy object 1311 comprises a query module 1312 and a first executing module 1313.

The first transmitting module 1322 is configured to transmit the script to the proxy object 1311 via the communication window 1330. Taking a user clicking a button created on the plug-in to trigger the webpage to become black as an example, when the user clicks the button on the plug-in, the active object 1321 obtains a script corresponding to a clicking operation of the button, and the first transmitting module 1322 transmits the script to the proxy object 1311 via the communication window 1330.

The first query module 1312 is configured to query for an interface related to script execution in the webpage process, and obtain a script executing method according to the interface; the first executing module 1313 is configured to execute the script according to the script executing method. After the proxy object 1311 receives the script corresponding to the above button clicking operation, the first query module 1312 queries for and obtains an IHTML Window interface in the webpage process, the IHTML Window interface is an interface related to the script execution, and ExecScript in the IHTML Window interface is a function for executing the script, i.e., the ExecScript function provides the script executing method. The first executing module 1313 executes the script corresponding to the above button clicking operation according to the script executing method provided by the ExecScript function to make the webpage become black.

The proxy object 1311 further comprises a third transmitting module 1314, a third scheduling identification obtaining module 1315, a third intercepting module 1316, wherein the third scheduling identification obtaining module 1315 further comprises a third invoking module 1317 and a third scheduling identification receiving module 1318. The active object 1321 further comprises a third receiving module 1323 and a third executing module 1324.

The third transmitting module 1314 is configured to transmit the script to the active object 1321 via the communication window 1330. Take obtainment of the version number of the plug-in as an example. Since the proxy object 1311 in the webpage process is not a true plug-in object, it does not know the version number of the plug-in, so the proxy object 1311 cannot directly feed back the version number of the plug-in to the webpage. After the independent process completes creation of the active object 1321, a variable of the active object 1321 is notified to the webpage, a webpage developer writes in the webpage a script for obtaining the version number of plug-in according to the variable, and the to-be-executed method in the script is intended to obtain the version number of the plug-in. The third transmitting module 1314 transmits the script for obtaining the version number of the plug-in to the active object 1321 via the communication window 1330.

The third scheduling identification obtaining module 1315 is configured to obtain a scheduling identification of the to-be-executed method in the script by invoking the scheduling interface of the active object 1321, wherein the third invoking module 1317 is configured to invoke the scheduling interface of the active object 1321 and enable the active object 1321 to execute a method of obtaining a scheduling identification of the to-be-executed in the script to obtain the scheduling identification; the third scheduling identification receiving module 1318 is configured to receive the scheduling identification returned by the active object 1321 via the communication window 1330. First, the webpage process module 1310 parses the script and schedules a name of the to-be-executed method in the script to an IDispatch interface of the proxy object 1311. As the proxy object 1311 cannot obtain the scheduling identification (ID) of the to-be-executed method in the script, the third scheduling module 1317 of the proxy object 1311 invokes the IDispatch interface of the active object 1321 via the communication window 1330. The active object 1321 is an object of the true plug-in, the method provided by the GetIDsOfNames function of the active object 1321 is invoked to enable the active object 1321 to obtain the scheduling ID of the to-be-executed method, and then the active object 1321 returns the scheduling ID to the third scheduling identification receiving module 1318 of the proxy object 1311 via the communication window 1330.

The third intercepting module 1316 is configured to intercept an instruction in the webpage process executing the to-be-executed method in the script and transmit the instruction to the active object 1321. After the proxy object 1311 obtains the scheduling ID of the to-be-executed method, the scheduling ID is fed back to the webpage, and the webpage process will execute an instruction of the Invoke(ID) in next step according to a conventional flow. However, the third intercepting module 1316 intercepts the instruction of Invoke(ID) of the webpage process and transmits the instruction of the Invoke(ID) to the active object 1321.

The third receiving module 1323 is configured to receive the script transmitted by the third transmitting module 1314 of the proxy object 1311 and the instruction transmitted by the third intercepting module 1316; the third executing module 1324 is configured to execute the to-be-executed method in the script by executing the instruction and then return an execution result to the proxy object 1311.

According to the functions performed by the above function modules, the proxy object of the first type of plug-in may execute the script of the active object, and the active object may execute the script of the proxy object, thereby achieving control of the webpage running in the webpage process by the active object running in the independent process and control of the active object running in the independent process by the webpage running in the webpage process.

Reference may be made to FIG. 5 which illustrates a structural block diagram of a system for executing a browser active object according to a further embodiment of the present invention.

The present invention further provides a browse comprising the system for executing any browser active object according to the above embodiment.

The embodiments of respective components of the present invention can be carried out in hardware, or in software modules run on one or more processors, or in the combination thereof. The skilled person in the art should understand that a microprocessor or a digital signal processor (DSP) can be used in practice to implement some or all functions of some or all components in the device for prompting information about an e-mail according to the embodiment of the present invention. The present invention can also be carried out as part or all of the device or device program (e.g., computer program and computer program product) for performing the method described here. Such a program for carrying out the present invention can be stored on a computer readable medium, or may have the form of one or more signals. Such signals can be downloaded from the internet website, or be provided on a carrier signal, or be provided in any other forms.

Figure 14:
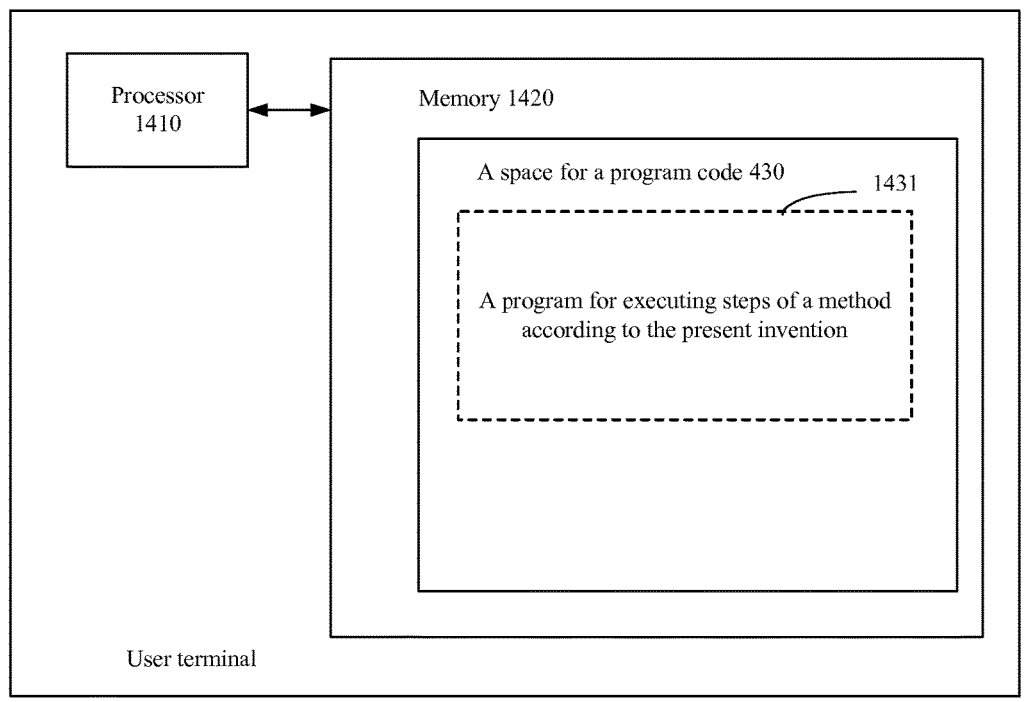
FIG. 14 schematically illustrates a block diagram of a server for executing the method according to the present invention.
Figure 15:
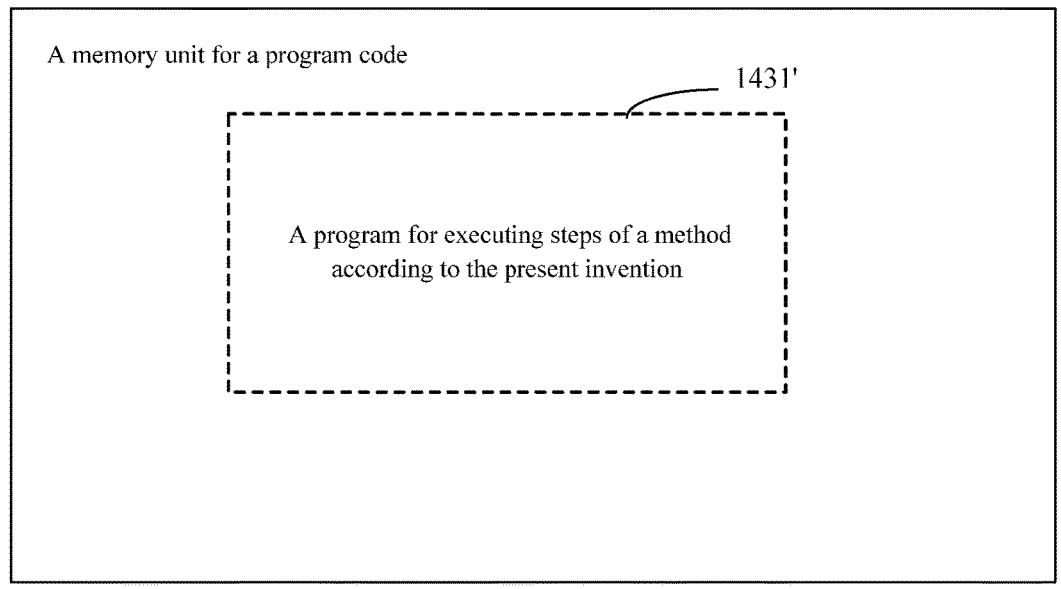
FIG. 15 schematically illustrates a memory unit for maintaining or carrying a program code for implementing the method according to the present invention.

For example, FIG. 14 schematically illustrates a user terminal that may implement the present invention. The user terminal conventionally comprises a processor 1410 and a computer program product or computer-readable medium in the form of a memory 1420. The memory 1420 may be a flash memory, EEPROM (Electrically Erasable Programmable Read-Only Memory), EPROM, hard disk or ROM-like electronic memory. The memory 1420 has a storage space 1430 for a program code 1431 for executing any step of the above method. For example, the storage space 1430 for the program code may comprise program codes 1431 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 15. The memory unit may have a storage section, a storage space or the like arranged in a similar way to the memory 1420 in the user terminal of FIG. 14. The program code may for example be compressed in a suitable form. Usually, the memory unit includes a computer-readable code 1431', namely, a code readable by a processor for example similar to 1410. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description as provided here describes a lot of specific details. However, it is appreciated that embodiments of the present invention may be implemented in the absence of these specific details. Some embodiments do not specify detail known methods, structures and technologies to make the description apparent.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims. Embodiments according to the present invention disclose A1: An inter-process script executing method, the method being adapted to a case that a proxy object running in a webpage process executes a script of an active object running in an independent process, the proxy object and the active object communication via pre-created communication windows, the method comprising: the active object transmits the script to the proxy object via the communication window; the proxy object queries for an interface in the webpage process related to script execution, and obtains a script executing method according to the interface; the proxy object executes the script according to the script executing method. A2. The method according to A1, the proxy object running in the webpage process is created in place of an active object actually to be created by intercepting a procedure of the webpage process of the browser creating an active object; the active object running in the independent process is created in the independent process independent from the webpage process when the webpage process activates the proxy object; the communication windows respectively created in the active object and the proxy object are used to enable the active object and the proxy object to communicate. A3. The method according to A2, there are a plurality of proxy objects running in the webpage process, there are a plurality of active objects running in the independent process, there is a one-to-one correspondence between the proxy objects and the active objects, the communication window of the proxy object has a corresponding attribute to the communication window of the active object corresponding to the proxy object, and communication between the active object and the proxy object is achieved through the two communication windows.

Embodiments according to the present invention further disclose B4: an inter-process script executing method, the method being adapted to a case that an active object running in an independent process executes a script of a proxy object running in a webpage process, the proxy object and the active object communication via pre-created communication windows, the method comprising: the proxy object transmits the script to the active object via the communication window; the proxy object obtains a scheduling identification of a to-be-executed method in the script by invoking a scheduling interface of the active object; the proxy object intercepts an instruction in the webpage process executing the to-be-executed method in the script and transmits the instruction to the active object; the active object executes the to-be-executed method in the script by executing the instruction, and then returns an execution result to the proxy object. B5. The method according to B4, the step of the proxy object obtaining a scheduling identification of a to-be-executed method in the script by invoking a scheduling interface of the active object comprises: by invoking the scheduling interface of the active object, the proxy object enables the active object to execute a method of obtaining a scheduling identification of a to-be-executed method in the script, and the active object returns the scheduling identification to the proxy object via the communication window. B6. The method according to B4 or B5, the proxy object running in the webpage process is created in place of an active object actually to be created by intercepting a procedure of the webpage process of the browser creating an active object; the active object running in the independent process is created in the independent process independent from the browser webpage process when the webpage process activates the proxy object; the communication windows respectively created in the active object and the proxy object are used to enable the active object and the proxy object to communicate. B7. The method according to B6, there are a plurality of proxy objects running in the webpage process, there are a plurality of active objects running in the independent process, there is a one-to-one correspondence between the proxy objects and the active objects, the communication window of the proxy object has a corresponding attribute with the communication window of the active object corresponding to the proxy object, and communication between the active object and the proxy object is achieved through the two communication windows.

Embodiments according to the present invention disclose C8: an inter-process script executing system comprising: a proxy object running in a webpage process, an active object running in an independent process and a pair of communication windows respectively created in the proxy object and the active object; the system is adapted to a case that the proxy object executes a script of the active object, and the proxy object and active object communicate via the pair of communication windows; the active object comprises a transmitting module which is configured to transmit a script to the proxy object via the communication window; the proxy object comprises: a query module configured to query for an interface related to script execution in the webpage process, and obtain a script executing method according to the interface; an executing module configured to execute the script according to the script executing method. C9. The system according to C8, the proxy object running in the webpage process is created in place of an active object actually to be created by intercepting a procedure of the webpage process of the browser creating an active object; the active object running in the independent process is created in the independent process independent from the webpage process when the webpage process activates the proxy object; the pair of communication windows respectively created in the active object and the proxy object are used to enable the active object and the proxy object to communicate. C10. The system according to C9, there are a plurality of proxy objects running in the webpage process, there are a plurality of active objects running in the independent process, there is a one-to-one correspondence between the proxy objects and the active objects, the communication window of the proxy object has a corresponding attribute to the communication window of the active object corresponding to the proxy object, and communication between the active object and the proxy object is achieved through the pair of communication windows.

Embodiments according to the present invention disclose D11: a browser comprising the inter-process script executing system according to any one of C8 to C10.

Embodiments according to the present invention disclose E12: an inter-process script executing system comprising: a proxy object running in a webpage process, an active object running in an independent process and a pair of communication windows respectively created on the proxy object and the active object; the system is adapted to a case that the active object executes a script in the webpage process, and the proxy object and active object communicate via the pair of communication windows; the proxy object comprises a transmitting module configured to transmit the script to the active object via the communication window; a scheduling identification obtaining module configured to obtain a scheduling identification of the to-be-executed method in the script by invoking the scheduling interface of the active object; an intercepting module configured to intercept an instruction in the webpage process executing the to-be-executed method in the script and transmit the instruction to the active object; the active object comprises: a receiving module configured to receive the script transmitted by a transmitting module in the proxy object and an instruction transmitted by an intercepting module; an executing module configured to execute the to-be-executed method in the script by executing the instruction and then return an execution result to the proxy object. E13. The system according to E12, the scheduling identification obtaining module comprises: an invoking module configured to invoke a scheduling interface of the active object and enable the active object to execute a method of obtaining a scheduling identification of the to-be-executed in the script to obtain the scheduling identification; a scheduling identification receiving module configured to receive the scheduling identification returned by active object via the communication window. E14. The system according to E12 or E13, the proxy object running in the webpage process is created in place of an active object actually to be created by intercepting a procedure of the webpage process of the browser creating an active object; the active object running in the independent process is created in the independent process independent from the browser webpage process when the webpage process activates the proxy object; the communication windows respectively created in the active object and the proxy object are used to enable the active object and the proxy object to communicate. E15. The system according to E14, there are a plurality of proxy objects running in the webpage process, there are a plurality of active objects running in the independent process, there is a one-to-one correspondence between the proxy objects and the active objects, the communication window of the proxy object has a corresponding attribute with the communication window of the active object corresponding to the proxy object, and communication between the active object and the proxy object is achieved through the pair of communication windows.

Embodiments according to the present invention disclose F16: a browser comprising the inter-process script executing system according to any one of E12 to E15.

Embodiments according to the present invention further disclose G1: a method of executing a browser active object, the active object being an object corresponding to ta plug-in, the method comprising: obtaining a type of the plug-in before the active object is created; and intercepting a procedure of a webpage process creating the active object, and creating a proxy object to replace an active object actually to be created according to the type of the plug-in, with the proxy object running in the webpage process; when the webpage process activates the proxy object, the active object actually to be created is created in an independent process independent from the webpage process, and the active object is run in the independent process; the active object and the proxy object communicating via the communication windows, thus realizing that the proxy object invokes the active object and/or the active object invokes the proxy object. E2. The method according to E1, if the plug-in is determined as a second type of plug-in according to the type of the plug-in, the step of intercepting a procedure of the webpage process creating the active object further comprises: intercepting the webpage process to query for a safety interface of a pre-created active object, and returning information indicating the second type of plug-in is a safe plug-in. E3. The method according to E2, the step of creating the active object actually to be created in an independent process independent from the webpage process comprises: intercepting the independent process querying for an IWeBrowser2 interface, and returning a self-created IWeBrowser2 interface so as to create the active object actually to be created. E4. The method according to E1 or E2 or E3, communication between the active object and the proxy object via the communication windows comprises a script executing procedure between the active object and the proxy object. E5. The method according to E4, the script executing procedure between the active object and the proxy object comprises execution of the script of the active object by the proxy object, if the plug-in is determined to be a first type of plug-in according to the type of the plug-in, the procedure of the proxy object executing the script of the active object comprises: the active object transmits the script to the proxy object via the communication window; the proxy object queries for an interface in the webpage process related to script execution, and obtains a script executing method according to the interface; the proxy object executes the script according to the script executing method. E6. The method according to E4, the script executing procedure between the active object and the proxy object comprises execution of the script of the active object by the proxy object, if the plug-in is determined to be the second type of plug-in according to the type of the plug-in, the procedure of proxy object executing the script of the active object comprises: the active object transmits the script to the proxy object via the communication window; the active object obtains a scheduling identification of the to-be-executed method in the script by invoking a scheduling interface of the proxy object; the active object intercepts an instruction in the independent process executing the to-be-executed method in the script and transmits the instruction to the proxy object; the proxy object executes the to-be-executed method in the script by executing the instruction, and then returns an execution result to the active object. E7. The method according to E6, the step of the active object obtaining a scheduling identification of the to-be-executed method in the script by invoking a scheduling interface of the proxy object comprises: by invoking a scheduling interface of the proxy object, the active object enables the proxy object to execute a method of obtaining a scheduling identification of a to-be-executed method in the script, and then the proxy object returns the scheduling identification to the active object via the communication window. E8. The method according to E4, the script executing procedure between the active object and the proxy object comprises execution of the script of the proxy object by the active object, and the procedure of the active object executing the script of the proxy object comprises: the proxy object transmits the script to the active object via the communication window; the proxy object obtains a scheduling identification of a to-be-executed method in the script by invoking a scheduling interface of the active object; the proxy object intercepts an instruction in the webpage process executing the to-be-executed method in the script and transmits the instruction to the active object; the active object executes the to-be-executed method in the script by executing the instruction, and then returns an execution result to the proxy object. E9. The method according to E8, the step of the proxy object obtaining a scheduling identification of a to-be-executed method in the script by invoking a scheduling interface of the active object comprises: by invoking the scheduling interface of the active object, the proxy object enables the active object to execute a method of obtaining a scheduling identification of a to-be-executed method in the script, and the active object returns the scheduling identification to the proxy object via the communication window. E10. The method according to any one of E1 to E9, there are a plurality of proxy objects running in the webpage process, there are a plurality of active objects running in the independent process, there is a one-to-one correspondence between the proxy objects and the active objects, the communication window of the proxy object has a corresponding attribute with the communication window of the active object corresponding to the proxy object, and communication between the active object and the proxy object is achieved through the two communication windows. E11. The method according to E5, the first type of plug-in is a Flash plug-in. E12. The method according to E6, the second type of plug-in is Baidu video or QVOD.

Embodiments according to the present invention further disclose F13: a system of executing a browser active object, comprising: a webpage process module configured to obtain a type of the plug-in before the active object is created; and intercept a procedure of a webpage process creating the active object, and create a proxy object to replace an active object actually to be created according to the type of the plug-in, with the proxy object running in the webpage process; an independent process module configured to, when the webpage process activates the proxy object, create the active object actually to be created in an independent process independent from the webpage process according to the type of the plug-in, with the active object running in the independent process; the proxy object is located in the webpage process module, the active object located in the independent process module, and a communication window is respectively created in the active object and the proxy object, the active object is an active object corresponding to the plug-in, the active object and the proxy object communicate via the communication windows, thus realizing that the proxy object invokes the active object and/or the active object invokes the proxy object. F14. The system according to F13, if the plug-in is determined as a second type of plug-in according to the type of the plug-in, the webpage process module is further configured to intercept the webpage process to query for a safety interface of a pre-created active object, and return information indicating the second type of plug-in is a safe plug-in. F15. The system according to F14, the independent process module is further configured to intercept the independent process querying for an IWeBrowser2 interface, and return a self-created IWeBrowser2 interface so as to create the active object actually to be created. F16. The system according to F13, if the plug-in is determined to be a first type of plug-in according to the type of the plug-in, the proxy object comprises: a first transmitting module configured to transmit the script to the proxy object via the communication window; the proxy object comprises: a first query module configured to query for an interface in the webpage process related to script execution, and obtain a script executing method according to the interface; a first executing module configured to execute the script according to the script executing method. F17. The system according to F14 or F15, if the plug-in is determined to be the second type of plug-in according to the type of the plug-in, the active object comprises: a second transmitting module configured to transmit the script to the proxy object via the communication window; a second scheduling identification obtaining module configured to obtain a scheduling identification of the to-be-executed method in the script by invoking a scheduling interface of the proxy object; a second intercepting module configured to intercept an instruction in the independent process executing the to-be-executed method in the script and transmit the instruction to the proxy object; the proxy object comprises: a second receiving module configured to receive the script transmitted by the second transmitting module of the active object and the instruction transmitted by the second intercepting module; a second executing module configured to execute the to-be-executed method in the script by executing the instruction and then return an execution result to the proxy object. F18. The system according to F17, the second scheduling identification obtaining module comprises: a second invoking module configured to invoke a scheduling interface of the proxy object and enable the proxy object to execute a method of obtaining a scheduling identification of a to-be-executed method in the script to obtain the scheduling identification; a second scheduling identification receiving module configured to receive the scheduling identification returned by the proxy object via the communication window. F19. The system according to F.13, or F15 or FIG. 15, the proxy object comprises: a third transmitting module configured to transmit the script to the active object via the communication window; a third scheduling identification obtaining module configured to obtain a scheduling identification of a to-be-executed method in the script by invoking a scheduling interface of the active object; a third intercepting module configured to intercept an instruction in the webpage process executing the to-be-executed method in the script and transmit the instruction to the active object; the active object comprises: a third receiving module configured to receive a script transmitted by the third transmitting module in the proxy object and an instruction transmitted by the third intercepting module; a third executing module configured to execute the to-be-executed method in the script by executing the instruction, and then return an execution result to the proxy object. F.20 The third scheduling identification obtaining module comprises: a third invoking module configured to, by invoking the scheduling interface of the active object, enable the active object to execute a method of obtaining a scheduling identification of a to-be-executed method in the script to obtain the scheduling identification; a third scheduling identification receiving module configured to receive the scheduling identification returned by the active object via the communication window. F21. The system according to any one of F13 to F20, the webpage process module comprises a plurality of proxy objects, the independent process module comprises a plurality of active objects, there is a one-to-one correspondence between the proxy objects and the active objects, the communication window of the proxy object has a corresponding attribute to the communication window of the active object corresponding to the proxy object, and communication between the active object and the proxy object is achieved through the two communication windows. F22. The system according to F16, the first type of plug-in is a Flash plug-in. F23. The system according to F17, the second type of plug-in is Baidu video or QVOD.

Embodiments according to the present invention further disclose G24: a browser comprising a system for executing a browser active object according to any one of F13 to F23.

The invention claimed is:
1. A method for executing an active object of a browser, the active object being an object corresponding to an ActiveX plug-in, the method comprising:
before the active object is created, intercepting, by at least one processor, a webpage process to query for a safety interface of a pre-created active object corresponding to the active object, and returning information indicating the ActiveX plug-in is a safe plug-in;
intercepting, by the at least one processor, a procedure of the webpage process creating the active object, and creating a proxy object to replace the active object, with the proxy object running in the webpage process;
when the webpage process activates the proxy object, creating, by the at least one processor, the active object in an independent process independent from the webpage process, with the active object running in the independent process;
creating, by the at least one processor, a communication window for each of the active object and the proxy object; and
the active object and the proxy object communicating, by the at least one processor, via the communication windows, and the proxy object invoking the active object and/or the active object invoking the proxy object.

2. The method according to claim 1, wherein creating the active object in the independent process independent from the webpage process comprises: intercepting the independent process to query for an IWeBrowser2 interface, and returning a self-created IWeBrowser2 interface to create the active object.

3. The method according to claim 1, wherein the communication between the active object and the proxy object via the communication windows comprises a script executing procedure between the active object and the proxy object.

4. The method according to claim 3, wherein the script executing procedure between the active object and the proxy object comprises an execution of a script of the active object by the proxy object, and the procedure of the proxy object executing the script of the active object comprises:
  the active object transmitting the script to the proxy object via the communication window;
  the active object obtaining a scheduling identification of a to-be-executed method in the script by invoking a scheduling interface of the proxy object;
  the active object intercepting an instruction in the independent process executing the to-be-executed method in the script and transmitting the instruction to the proxy object; and
  the proxy object executing the to-be-executed method in the script by executing the instruction and then returning an execution result to the active object.

5. The method according to claim 4, wherein the active object obtaining the scheduling identification of the to-be-executed method in the script by invoking the scheduling interface of the proxy object comprises:
  by invoking the scheduling interface of the proxy object, the active object enabling the proxy object to execute a method of obtaining the scheduling identification of the to-be-executed method in the script, and then the proxy object returning the scheduling identification to the active object via the communication window.

6. The method according to claim 3, wherein the script executing procedure between the active object and the proxy object comprises an execution of a script of the proxy object by the active object, and the procedure of the active object executing the script of the proxy object comprises:
  the proxy object transmitting the script to the active object via the communication window;
  the proxy object obtaining a scheduling identification of a to-be-executed method in the script by invoking the scheduling interface of the active object;
  the proxy object intercepting an instruction in the webpage process executing the to-be-executed method in the script and transmitting the instruction to the active object; and
  the active object executing the to-be-executed method in the script by executing the instruction, and then returning an execution result to the proxy object.

7. The method according to claim 6, wherein the proxy object obtaining the scheduling identification of the to-be-executed method in the script by invoking the scheduling interface of the active object comprises:
  by invoking the scheduling interface of the active object, the proxy object enabling the active object to execute a method of obtaining the scheduling identification of the to-be-executed method in the script, and then the active object returning the scheduling identification to the proxy object via the communication window.

8. The method according to claim 1, wherein there are a plurality of proxy objects running in the webpage process, there are a plurality of active objects running in the independent process, there is a one-to-one correspondence between the proxy objects and the active objects, the communication window of the proxy object has a corresponding attribute with the communication window of the active object corresponding to the proxy object, and communication between the active object and the proxy object is achieved through the two communication windows.

9. The method according to claim 1, wherein the ActiveX plug-in is Baidu video or QVOD.

10. A system for executing an active object of a browser, comprising at least one processor to execute:
  before the active object is created, a webpage process to intercept a webpage process to query for a safety interface of a pre-created active object corresponding to the active object, and return information indicating the active object is a safe plug-in;
  intercept a procedure of the webpage process creating the active object, and create a proxy object to replace the active object, with the proxy object running in the webpage process;
  when the webpage process activates the proxy object, an independent process to create the active object independent from the webpage process, with the active object running in the independent process; and
  the proxy object is located in the webpage process, the active object is located in the independent process, and a communication window is created for each of the active object and the proxy object, the active object being an active object corresponding to the ActiveX plug-in, the active object and the proxy object communicating via the communication windows, and the proxy object invoking the active object and/or the active object invoking the proxy object.

11. The system according to claim 10, wherein the independent process is further configured to intercept the independent process to query for an IWeBrowser2 interface, and return a self-created IWeBrowser2 interface to create the active object.

12. The system according to claim 10, wherein the active object comprises:
  a first transmitting module to transmit a script to the proxy object via the communication window;
  a first scheduling identification obtaining module to obtain a scheduling identification of a to-be-executed method in the script by invoking a scheduling interface of the proxy object; and
  a first intercepting module to intercept an instruction in the independent process executing the to-be-executed method in the script and transmit the instruction to the proxy object;
  the proxy object comprises:
  a first receiving module to receive the script transmitted by the first transmitting module of the active object and the instruction transmitted by the first intercepting module; and
  a first executing module to execute the to-be-executed method in the script by executing the instruction and then return an execution result to the active object.

13. The system according to claim 12, wherein the first scheduling identification obtaining module comprises:

a first invoking module to invoke the scheduling interface of the proxy object and enable the proxy object to execute a method of obtaining a scheduling identification of the to-be-executed method in the script to obtain the scheduling identification; and a first scheduling identification receiving module to receive the scheduling identification returned by the proxy object via the communication window.

14. The system according to claim 10, wherein the proxy object comprises:

a second transmitting module to transmit a script to the active object via the communication window;

a second scheduling identification obtaining module to obtain a scheduling identification of a to-be-executed method in the script by invoking a scheduling interface of the active object; and a second intercepting module to intercept an instruction in the webpage process executing the to-be-executed method in the script and transmit the instruction to the active object;

the active object comprises:

a second receiving module to receive the script transmitted by the second transmitting module of the proxy object and the instruction transmitted by the second intercepting module; and a second executing module to execute the to-be-executed method in the script by executing the instruction and then return an execution result to the proxy object.

15. The system according to claim 14, wherein the second scheduling identification obtaining module comprises:

a second invoking module to invoke the scheduling interface of the active object and enable the active object to execute a method of obtaining a scheduling identification of the to-be-executed method in the script to obtain the scheduling identification; and a second scheduling identification receiving module to receive the scheduling identification returned by the active object via the communication window.

16. The system according to claim 10, wherein the webpage process comprises a plurality of proxy objects, the independent process comprises a plurality of active objects, there is a one-to-one correspondence between the proxy objects and the active objects, the communication window of the proxy object has a corresponding attribute with the communication window of the active object corresponding to the proxy object, and communication between the active object and the proxy object is achieved through the two communication windows.

17. The system according to claim 10, wherein the ActiveX plug-in is Baidu video or QVOD.

18. A non-transitory computer readable medium having instructions stored thereon that, when executed by at least one processor, cause the at least one processor to perform operations for executing an active object of a browser, the active object being an object corresponding to an ActiveX plug-in, the operations comprising:

before the active object is created, intercepting a webpage process to query for a safety interface of a pre-created active object corresponding to the active object, and returning information indicating the ActiveX plug-in is a safe plug-in;

intercepting a procedure of the webpage process creating the active object, and creating a proxy object to replace the active object, with the proxy object running in the webpage process;

when the webpage process activates the proxy object, creating the active object in an independent process independent from the webpage process, with the active object running in the independent process;

creating a communication window for each of the active object and the proxy object; and the active object and the proxy object communicating via the communication windows, and the proxy object invoking the active object and/or the active object invoking the proxy object.

* * * * *